US010387775B2

(12) United States Patent
Cheng

(10) Patent No.: US 10,387,775 B2
(45) Date of Patent: Aug. 20, 2019

(54) MODEL-BASED CHARACTERIZATION OF PRESSURE/LOAD RELATIONSHIP FOR POWER PLANT LOAD CONTROL

(71) Applicant: EMERSON PROCESS MANAGEMENT POWER & WATER SOLUTIONS, INC., Pittsburgh, PA (US)

(72) Inventor: Xu Cheng, Pittsburgh, PA (US)

(73) Assignee: EMERSON PROCESS MANAGEMENT POWER & WATER SOLUTIONS, INC., Pittsburgh, PA (US)

( * ) Notice: Subject to any disclaimer, the term of this patent is extended or adjusted under 35 U.S.C. 154(b) by 737 days.

(21) Appl. No.: 14/848,576

(22) Filed: Sep. 9, 2015

(65) Prior Publication Data

US 2017/0068886 A1 Mar. 9, 2017

(51) Int. Cl.

*G06N 3/08* (2006.01)
*F01K 13/02* (2006.01)

(Continued)

(52) U.S. Cl.

CPC ............... *G06N 3/08* (2013.01); *F01K 13/02* (2013.01); *G05B 17/02* (2013.01); *G05B 19/042* (2013.01);

(Continued)

(58) Field of Classification Search

CPC ........ G06N 3/08; F01K 13/02; G05B 19/042; G05B 2219/2639; F22B 35/18

(Continued)

(56) References Cited

U.S. PATENT DOCUMENTS 5,305,230 A 4/1994 Matsumoto et al.
8,554,707 B2 * 10/2013 Schafer ................ G05B 13/027 706/20

(Continued)

FOREIGN PATENT DOCUMENTS

EP 2 910 743 A1 8/2015
JP 07-210208 A 11/1995

OTHER PUBLICATIONS

Search Report for Application No. GB1614397.6, dated Feb. 2, 2017.

*Primary Examiner* — Bo Fan
(74) *Attorney, Agent, or Firm* — Marshall, Gerstein & Borun LLP

(57) ABSTRACT

A control system uses a feedforward neural network model to perform control of a steam turbine power system in sliding pressure mode in a more efficient and accurate manner than a control scheme that uses only a multivariate linear regression model or a manufacturer-supplied correction function. Turbine inlet steam pressure of a steam turbine power generation system in sliding pressure control mode has a direct one-to-one relationship with the electrical energy load (output) of the steam turbine power system. This new control system provides a more accurate representation of the turbine inlet steam pressure, such that the power generated by a power plant is more closely controlled to the target (demand). More particularly, the feedforward neural network model prediction of the turbine inlet steam pressure more closely fits with the actual turbine inlet steam pressure with very little error, and thereby providing better control over the electrical energy load.

51 Claims, 9 Drawing Sheets

(51) Int. Cl.
*F22B 35/18* (2006.01)
*G05B 17/02* (2006.01)
*G05B 19/042* (2006.01)

(52) U.S. Cl.
CPC ...... *F22B 35/18* (2013.01); *G05B 2219/2639* (2013.01); *Y02B 70/3241* (2013.01); *Y04S 20/227* (2013.01)

(58) Field of Classification Search
USPC ................ 700/51, 282, 287, 56, 87; 706/25; 702/56
See application file for complete search history.

(56) References Cited

U.S. PATENT DOCUMENTS

| | | | | |
|---|---|---|---|---|
| 2003/0074338 | A1* | 4/2003 | Young | G05B 13/027 706/15 |
| 2007/0250215 | A1 | 10/2007 | Jia et al. | |
| 2010/0100248 | A1* | 4/2010 | Minto | F01D 11/20 700/287 |
| 2011/0056201 | A1* | 3/2011 | Kluge | F01K 3/181 60/653 |
| 2011/0066298 | A1* | 3/2011 | Francino | F01K 9/003 700/290 |
| 2012/0048953 | A1* | 3/2012 | Wang | G01M 9/04 236/51 |
| 2014/0039707 | A1* | 2/2014 | Curtis | F02D 25/00 700/288 |
| 2015/0107536 | A1* | 4/2015 | Janvier | F01K 13/02 122/406.1 |

* cited by examiner

400

MODEL-BASED CHARACTERIZATION OF PRESSURE/LOAD RELATIONSHIP FOR POWER PLANT LOAD CONTROL

TECHNICAL FIELD

This disclosure relates generally to the control of power generating equipment and, in particular, to the implementation of a model-based characterization of the relationship between turbine steam inlet pressure and electrical energy load for steam turbine power generation processes and systems operating in a sliding pressure control mode.

BACKGROUND

A variety of industrial as well as non-industrial applications use fuel burning boilers which typically operate to convert chemical energy into thermal energy by burning one of various types of fuels, such as coal, gas, oil, waste material, etc. An exemplary use of fuel burning boilers may be in thermal power generators, wherein fuel burning furnaces generate steam from water traveling through a number of pipes and tubes within a boiler, and the generated steam may be then used to operate one or more steam turbines to generate electricity. The electrical energy load (or power output) of a thermal power generator may be a function of the amount of heat generated in a boiler, wherein the amount of heat may be directly determined by the amount of fuel consumed (e.g., burned) per hour, for example.

In many cases, power generating systems include a boiler which has a furnace that burns or otherwise uses fuel to generate heat which, in turn, is transferred to water flowing through pipes or tubes within various sections of the boiler. A typical steam generating system includes a boiler having a superheater section (having one or more sub-sections) in which steam is produced and is then provided to and used within a first, typically high pressure, steam turbine. While the efficiency of a thermal-based power generator is heavily dependent upon the heat transfer efficiency of the particular furnace/boiler combination used to burn the fuel and transfer the heat to the steam flowing within the superheater section or any additional section(s) of the boiler, this efficiency is also dependent on the control technique used to control the temperature of the steam in the superheater section or any additional section(s) of the boiler. To increase the efficiency of the system, the steam exiting the first steam turbine may be reheated in a reheater section of the boiler, which may include one or more subsections, and the reheated steam may be then provided to a second, typically lower pressure steam turbine. However, both the furnace/boiler section of the power system as well as the turbine section of the power system must be controlled in a coordinated manner to produce a desired amount of power.

Moreover, the steam turbines of a power plant are typically run at different operating levels at different times to produce different amounts of electricity or power based on variable energy or load demands provided to the power plant. For example, in many cases, a power plant may be tied into an electrical power transmission and distribution network, sometimes called a power grid, and provides a designated amount of power to the power grid. In this case, a power grid manager or control (dispatch) authority typically manages the power grid to keep the voltage levels on the power grid at constant or near-constant levels (that may be within rated levels) and to provide a consistent supply of power based on the current demand for electricity (power) placed on the power grid by power consumers. Of course, the grid manager typically plans for heavier use and thus greater power requirements during certain times of the days than others, and during certain days of the week and year than others, and may run one or more optimization routines to determine the optimal amount and type of power that needs to be generated at any particular time by the various power plants connected to the grid to meet the current or expected overall power demands on the power grid.

As part of this process, the grid manager typically sends power or load demand requirements (also referred to as load demand set-points or electrical energy load set-points) to each of the power plants supplying power to the power grid, wherein electrical energy load set-points specify the amount of power that each particular power plant may be tasked to provide onto the power grid at any particular time. Of course, to effect proper control of the power grid, the grid manager may send new electrical energy load set-points for the different power plants connected to the power grid at any time, to account for expected and/or unexpected changes in power being supplied to, or consumed from, the power grid. For example, the grid manager may change the electrical energy load set-point for a particular power plant in response to expected or unexpected changes in the demand (which may be typically higher during normal business hours and on weekdays, than at night and on weekends). Likewise, the grid manager may change the electrical energy load set-point for a particular power plant in response to an unexpected or expected reduction in the supply of power on the grid, such as that caused by one or more power units at a particular power plant failing unexpectedly or being brought off-line for normal or scheduled maintenance.

The steam turbine power generation process can be thought of as having two main input process variables—fuel (energy) and turbine throttle valve—and two main output process variables—electrical energy load (megawatt or MW) and turbine steam inlet pressure. For the purpose of achieving high efficiency, many power plants operate in a sliding pressure mode. That is, turbine steam inlet pressure and electrical energy load have a direct, one-to-one relationship at a given operating point (e.g., the rated condition), such that controlling turbine steam inlet pressure is considered equivalent to controlling the electrical energy load. Typically, the relationship can be represented by a curve, where turbine steam inlet pressure is held constant when the electrical energy load is below 40%, and gradually increases as the electrical energy load increases above 40%. In sliding pressure mode, the turbine throttle valve at the inlet to the steam turbine is kept wide open (e.g., 100% open), while the boiler master (fuel) is utilized to control the inlet pressure (also referred to as turbine throttle pressure or turbine steam inlet pressure) to the desired electrical energy load set-point. The power plant controls the turbine steam inlet pressure as the primary output variable rather than electrical energy load, because although the power plant wants to meet the electrical energy load set-point as quickly and efficiently as possible, fast and/or arbitrary movements in the electrical energy load causes the steam pressure variable to swing wildly and uncontrollably due to the one-to-one relationship, thereby creating a safety issue. Controlling turbine steam inlet pressure presents a more reliable and stable manner of controlling the electrical energy load, which is considered more important than speed even though turbine steam inlet pressure is considered a second-best output control variable objective to electrical energy load.

In actual operation, the dispatching center sends the electrical energy load demand signal (e.g., a MW target set-point) to the power plant either by manually calling in or by connecting the demand signal through an Automatic Generation Control (AGC) mechanism. This electrical energy load set-point is converted to a turbine steam inlet pressure set-point in the distributed control system, and the distributed control system controls the pressure in the turbine steam inlet to this set-point. If the electrical energy load (MW) and turbine steam inlet pressure relationship is perfectly lined up, the actual electrical energy load will be controlled to its target.

However, the actual process does not always operate at the rated condition or any other fixed condition. For example, steam temperature and turbine exhaust pressure can deviate significantly from manufacturer design (i.e., the rated condition). Therefore, to maintain an accurate electrical energy load and turbine steam inlet pressure relationship, turbine manufacturers usually supply correction formulas/curves which can be used to modify the turbine steam inlet pressure set-point to achieve the electrical energy load set-point. These formulas are usually characterized by linear and polynomial equations, and are mostly experimentally determined. However, these correction formulas/curves are obtained based on a fixed set of data at the time of manufacture and/or installation. Over time, the unit process characteristics may change slightly, and the electrical energy load and turbine steam inlet pressure relationship needs to be re-calibrated from time-to-time, perhaps at various operating points. A multivariate linear regression model of the relationship between the turbine steam inlet pressure and the electrical energy load has been used in real-time with the steam turbine power generation process to better track this relationship and how the relationship changes over time. It works well in most conditions, but in certain conditions the actual electrical energy load is off from the electrical energy load set-point by as much as 2 MW. This difference results from an inaccurate electrical energy load and turbine steam inlet pressure relationship obtained by the linear multivariate regression method.

SUMMARY

A control scheme uses a feedforward neural network model to perform control of a steam turbine power generation process and system in sliding pressure mode in a more efficient and accurate manner than a control scheme that uses only a multivariate linear regression model or a manufacturer-supplied correction function. Turbine inlet steam pressure of a steam turbine power system in sliding pressure mode has a direct one-to-one relationship with the electrical energy load (output) of the steam turbine power system. This new control scheme is believed to provide a more accurate representation of the turbine inlet steam pressure, such that the power generated by a power plant is more closely controlled to the target (demand). More particularly, the feedforward neural network model prediction of the turbine inlet steam pressure more closely fits with the actual turbine inlet steam pressure with very little error, and thereby providing better control over the electrical energy load. This control scheme may also be applied to other types of power units that utilize sliding pressure mode. Additionally, this control scheme may be applied to power generation systems that control a process variable having a direct one-to-one relationship with the electrical energy load of the power generation system. As such, this control scheme may be applied in control systems that control processes or plant hardware that includes power generation hardware.

In one case, a power generation system includes multiple interconnected or interrelated pieces of power generating equipment including a steam turbine power generation unit, an electrical energy generation unit, a control system and a feedforward neural network model. The steam turbine power generation unit may have a turbine steam inlet system, a steam turbine coupled to the turbine steam inlet system, and a steam outlet. Moreover, the steam turbine may be powered by steam from the turbine steam inlet system. In this case, the electrical energy generation unit and the steam turbine are interconnected, such that the electrical energy generation unit is mechanically coupled to the steam turbine to produce an electrical energy load based on movement of the steam turbine. The control system develops a process control signal to control pressure in the turbine steam inlet system to thereby control the electrical energy load produced by the electrical energy generation unit. The feedforward neural network model models the relationship between turbine steam inlet pressure and the electrical energy load. Input of the feedforward neural network model include an electrical energy load set-point to produce a turbine steam inlet pressure set-point and the pressure set-point is coupled to an input of the downstream control system.

If desired, the power generation system further includes a burner system that burns a fuel to generate steam input to the turbine steam inlet system, and the control system includes a controller input generation unit and a controller operatively coupled to the controller input generation unit. An output of the feedforward neural network model is coupled to an input of the controller input signal generation unit, and the controller input signal generation unit develops a controller input signal for the controller. The controller develops the process control signal to control the burner system to thereby control the pressure in the turbine steam inlet system in response to the controller input signal. In addition, the controller input signal may include a controller valve input signal for the controller to control a turbine valve to thereby control an input of steam to the turbine steam inlet system. The controller valve input signal may include a value to maximize the input of steam to the turbine steam inlet system such that the power generation system is in a sliding pressure mode.

If desired, the power generation system further includes a reheater operatively coupled to the steam turbine power generation unit and a condenser operatively coupled to the steam outlet of the steam turbine power generation unit. The reheater reheats steam exiting the steam turbine power generation unit and provides the reheated steam back to the lower pressure section of the steam turbine power generation unit. The condenser receives steam exhausted from the steam turbine power generation unit. In this case, the feedforward neural network model may include a multivariable input including the electrical energy load set-point, a reheat steam temperature deviation, a main steam temperature deviation (at turbine inlet), a turbine throttle pressure deviation, a condenser back pressure deviation, and auxiliary steam flow. Each of the reheat temperature deviation, the turbine steam inlet temperature deviation, the condenser back pressure deviation, and the auxiliary steam flow have an effect on the electrical energy load. In addition, the feedforward neural network model may include a neural network having one hidden layer of sigmoid-type neurons.

If desired, the power generation system may include a model adaptation unit that adapts a model to produce the pressure set-point control system output. In this case, the model adaptation unit is operatively coupled to the electrical energy generation unit, such that an input of the model adaptation unit includes the electrical energy load set-point and the electrical energy load. The model adaptation unit adapts the model based on a difference between the electrical energy load set-point and the electrical energy load. Moreover, the model adaptation unit may adapt the model if the power generation system is operating in a steady-state, and the difference between the electrical energy load set-point and the electrical energy load exceeds a threshold value. In addition, the model adaptation unit may train a new feedforward neural network model of the relationship between the turbine steam inlet pressure and the electrical energy load using process data from the power generation system as training data. The model adaptation unit may also train a multivariate linear regression model of the relationship between the turbine steam inlet pressure and the electrical energy load using the training data. Further, the model adaptation unit may compute a root-mean-square error for each of the new feedforward neural network model and the multivariate linear regression model using process data from the power generation system as testing data. The model adaptation unit may also compute a root-mean-square error for each of the feedforward neural network model operatively coupled to the control system, a previous multivariate linear regression model of the relationship between the turbine steam inlet pressure and the electrical energy load, and a design model of the relationship between the turbine steam inlet pressure and the electrical energy load using the testing data. The model adaptation unit may select one of the new feedforward neural network model and the multivariate linear regression model having the minimum root-mean-square error. Still further, the model adaptation unit may select one of the new feedforward neural network model and the multivariate linear regression model, the feedforward neural network model operatively coupled to the control system, the previous multivariate linear regression model and the design model having the minimum root-mean-square error. The model adaptation unit is adapted to replace the feedforward neural network model operatively coupled to the control system if the selected model is the new feedforward neural network model, the new multivariate linear regression model, the old multivariate linear regression model or the design model.

In another example, a power generation system includes multiple interconnected or interrelated pieces of power generating equipment including a steam turbine power generation unit, an electrical energy generation unit, a control system and a model adaptation unit. The steam turbine power generation unit may have a turbine steam inlet system, a steam turbine coupled to the turbine steam inlet system, and a steam outlet. Moreover, the steam turbine may be powered by steam from the turbine steam inlet system. The electrical energy generation unit and the steam turbine are interconnected, such that the electrical energy generation unit is mechanically coupled to the steam turbine to produce an electrical energy load based on movement of the steam turbine. The control system develops a process control signal to control pressure in the turbine steam inlet system to thereby control the electrical energy load produced by the electrical energy generation unit. In this case, the model adaptation unit and electrical energy generation unit are interconnected, such that the model adaptation unit adapts a feedforward neural network model of a relationship between turbine steam inlet pressure and the electrical energy load using process data from the power generation system as training data. The feedforward neural network model may produce a pressure set-point control system output from an electrical energy load set-point for the control system.

If desired, the model adaptation unit is operatively coupled to the electrical energy generation unit, such that an input of the model adaptation unit includes the electrical energy load set-point and the electrical energy load. In this case, the model adaptation unit may adapt models based on a difference between the electrical energy load set-point and the electrical energy load. In addition, the model adaptation unit may adapt models if the power generation system is operating in a steady-state and the difference between the electrical energy load set-point and the electrical energy load exceeds a threshold value. Moreover, the model adaptation unit trains a multivariate linear regression model of the relationship between the turbine steam inlet pressure and the electrical energy load using the training data, and/or computes a root-mean-square error for each of the feedforward neural network model and the multivariate linear regression model using process data from the power generation system as testing data. The model adaptation unit may select one of the feedforward neural network model and the multivariate linear regression model having the minimum root-mean-square error, such that an input of the selected model includes an electrical energy load set-point to produce a pressure set-point control system output, and the pressure set-point control system output of the selected model is coupled to an input of the control system. Further, the model adaptation unit may compute a root-mean-square error for a previous feedforward neural network model of the relationship between the turbine steam inlet pressure and the electrical energy load, a previous multivariate linear regression model of the relationship between the turbine steam inlet pressure and the electrical energy load, and a design model of the relationship between the turbine steam inlet pressure and the electrical energy load using the testing data. The model adaptation unit may select one of the feedforward neural network model, the multivariate linear regression model, the previous feedforward neural network model, the previous multivariate linear regression model and the design model based on the root-mean-square error for each model having the minimum root-mean-square error, such that an input of the selected model includes an electrical energy load set-point to produce a pressure set-point control system output, and the pressure set-point control system output of the selected model is coupled to an input of the control system.

If desired, the power generation system further includes a burner system that burns a fuel to generate steam input to the turbine steam inlet system, and the control system includes a controller input generation unit and a controller operatively coupled to the controller input generation unit. An output of the feedforward neural network model is coupled to an input of the controller input signal generation unit, and the controller input signal generation unit develops a controller input signal for the controller. The controller develops the process control signal to control the burner system to thereby control the pressure in the turbine steam inlet system in response to the controller input signal. In addition, the controller input signal may include a controller valve input signal for the controller to control a turbine valve to thereby control an input of steam to the turbine steam inlet system. Further, the controller valve input signal may include a value to maximize the input of steam to the turbine steam inlet system such that the power generation system is in a sliding pressure mode.

If desired, the power generation system further includes a reheater operatively coupled to the steam turbine power generation unit and a condenser operatively coupled to the steam outlet of the steam turbine power generation unit. The reheater reheats steam exiting the steam turbine power generation unit and provides the reheated steam back to the steam turbine power generation unit. The condenser receives steam exhausted from the steam turbine power generation unit. In this case, the feedforward neural network model may include a multivariable input including the electrical energy load set-point, a reheat temperature deviation, a turbine steam inlet temperature deviation, a condenser back pressure deviation, and an auxiliary steam flow, wherein each of the reheat temperature deviation, the turbine steam inlet temperature deviation, the condenser back pressure deviation, and the auxiliary steam flow have an effect on the electrical energy load. In addition, the feedforward neural network model may include a neural network having at least one hidden layer of sigmoid-type neurons.

In another example, a method of controlling a power generation process in a sliding pressure mode, the power generating process having a steam turbine power generation unit and an electrical energy generation unit, includes receiving a set-point indicating a desired output of the electrical energy generation unit. The method models, via a neural network model, a relationship between an output of the electrical energy generation unit and pressure within a turbine steam inlet system to the steam turbine power generation unit in response to the set-point indicating the desired output to develop a predicted pressure set-point control system output. The method then executes a control routine that determines a control signal for use in controlling the operation of the steam turbine power generation unit based on the predicted pressure set-point control system output.

If desired, the power generation process may have a burner system that burns a fuel to generate steam input to the turbine steam inlet system. In this case, executing a control routine that determines a control signal for use in controlling the operation of the steam turbine power generation unit includes executing a control routine that determines a control signal for use in controlling the burner system to thereby control the pressure in the turbine steam inlet system. Executing the control routine further may also include executing a control routine that determines a valve control signal for use in controlling the operation of a turbine valve to thereby control an input of steam to the turbine steam inlet system. The valve control signal may include a value to maximize the valve opening to the turbine steam inlet system such that the power generation process is in the sliding pressure mode.

If desired, modeling, via the neural network model, the relationship between the output of the electrical energy generation unit and the pressure within a turbine steam inlet system to the steam turbine power generation unit in response to the set-point indicating the desired output further includes modeling, via the neural network model, the relationship between the output of the electrical energy generation unit and the pressure within a turbine steam inlet system to the steam turbine power generation unit in response to a reheat temperature deviation, a turbine steam inlet temperature deviation, a condenser back pressure deviation, and an auxiliary steam flow.

If desired, the method may further include measuring an electrical energy load output of the electrical energy generating unit, and adapting a model of the relationship between the output of the electrical energy generating unit and the pressure at the turbine inlet based on a difference between the set-point indicating the desired output and the measured electrical energy load output. In this case, adapting the model of the relationship between the output of the electrical energy generating unit and the pressure within the turbine steam inlet system may include adapting the model of the relationship between the output of the electrical energy generating unit and the pressure at the turbine inlet if the power generation process is operating in a steady-state and the difference between the set-point indicating the desired output and the measured electrical energy load output exceeds a threshold value. In addition, adapting the model of the relationship between the output of the electrical energy generating unit and the pressure at the turbine system inlet may include training a neural network model of the relationship between the output of the electrical energy generating unit and the pressure at the turbine system inlet. Training a neural network model of the relationship between the output of the electrical energy generating unit and the pressure at the turbine system inlet may include training a neural network model of the relationship between the output of the electrical energy generating unit and the pressure at the turbine system inlet using process data from the power generation process as training data. Adapting the model of the relationship between the output of the electrical energy generating unit and the pressure at the turbine system inlet may further include training a multivariate linear regression model of the relationship between the output of the electrical energy generating unit and the pressure at the turbine system inlet. Training a multivariate linear regression model of the relationship between the output of the electrical energy generating unit and the pressure at the turbine system inlet may include training a multivariate linear regression model of the relationship between the output of the electrical energy generating unit and the pressure at the turbine system inlet using process data from the power generation process as training data.

If desired, the method may include determining a root-mean-square error for each of the neural network model and the multivariate linear regression model. Determining the root-mean-square error for each of the neural network model and the multivariate linear regression model may include determining the root-mean-square error for each of the neural network model and the multivariate linear regression model using process data from the power generation process as testing data. In addition, the method may include determining a root-mean-square error for each of a previous neural network model of the relationship between the output of the electrical energy generating unit and the pressure at the turbine system inlet, a previous multivariate linear regression model of the relationship between the output of the electrical energy generating unit and the pressure at the turbine system inlet, and a design model of the relationship between the output of the electrical energy generating unit and the pressure at the turbine system inlet, and selecting one of the neural network model, the multivariate linear regression model, the previous neural network model, the previous multivariate linear regression model and the design model with the minimum root-mean-square error for the power generation process. Determining the root-mean-square error for each of the neural network model, the multivariate linear regression model, the previous neural network model, the previous multivariate linear regression model and the design model may include determining the root-mean-square error for each of the neural network model, the multivariate linear regression model, the previous neural network model, the previous multivariate linear regression model and the design model using process data from the power generation process as testing data.

If desired, modeling, via the neural network model, the relationship between the output of the electrical energy generation unit and pressure at a turbine system inlet to the steam turbine power generation unit may include implementing a feedforward neural network model that models the load output of the electrical energy generation unit in response to the predicted set-point control system output provided to the control routine.

In another example, a method of adapting a model for a steam turbine power generation process in a sliding pressure mode having a steam turbine power generation unit and an electrical energy generation unit, includes receiving a set-point indicating a desired output of the electrical energy generation unit. The method executes a control routine that determines a control signal for use in controlling the operation of the steam turbine power generation unit based on a pressure set-point control system output predicted by a first neural network model of a relationship between an output of the electrical energy generation unit and pressure at a turbine system inlet of the steam turbine power generation unit in response to the set-point indicating the desired output to develop the predicted pressure set-point control system output, and measures an actual output of the electrical energy generation unit in response to the set-point indicating a desired output of the electrical energy generation unit during a steady-state operation of the power generation process. The method may then adapt a second neural network model of the relationship between the output of the electrical energy generation unit and pressure at the inlet of the steam turbine power generation unit if a difference between the actual output of the electrical energy generation unit and the set-point indicating a desired output of the electrical energy generation unit is greater than a predetermined threshold.

If desired, adapting the second neural network model may include training the second neural network model using process data from the power generation process as training data. In this case, the method may further include training a first multivariate linear regression model of the relationship between the output of the electrical energy generation unit and pressure at the turbine system inlet of the steam turbine power generation unit using the training data. In addition, the method may include computing a root-mean-square error for each of the second neural network model and the first multivariate linear regression model using process data from the power generation process as testing data. Moreover, the method may include selecting one of the second neural network model and the first multivariate linear regression model with the minimum root-mean-square error, and operatively coupling the selected model to a control system of the power generation process to produce a pressure set-point control system output, wherein an input of the selected model includes the set-point indicating the desired output of the electrical energy generation unit and the pressure set-point control system output is coupled to an input of the control system. Further, the method may include computing a root-mean-square error for each of the first neural network model, a second multivariate linear regression model of the relationship between the output of the electrical energy generation unit and pressure at the turbine inlet of the steam turbine power generation unit and a design model of the relationship between the output of the electrical energy generation unit and pressure at the turbine system inlet of the steam turbine power generation unit. The method may then select one of the first neural network model, second neural network model, the first multivariate linear regression model, the second multivariate linear regression model and the design model with the minimum root-mean-square error, and operatively couple the selected model to a control system of the power generation process to produce a pressure set-point control system output, wherein an input of the selected model includes the set-point indicating the desired output of the electrical energy generation unit and the pressure set-point control system output is coupled to an input of the control system.

DETAILED DESCRIPTION

Figure 1:
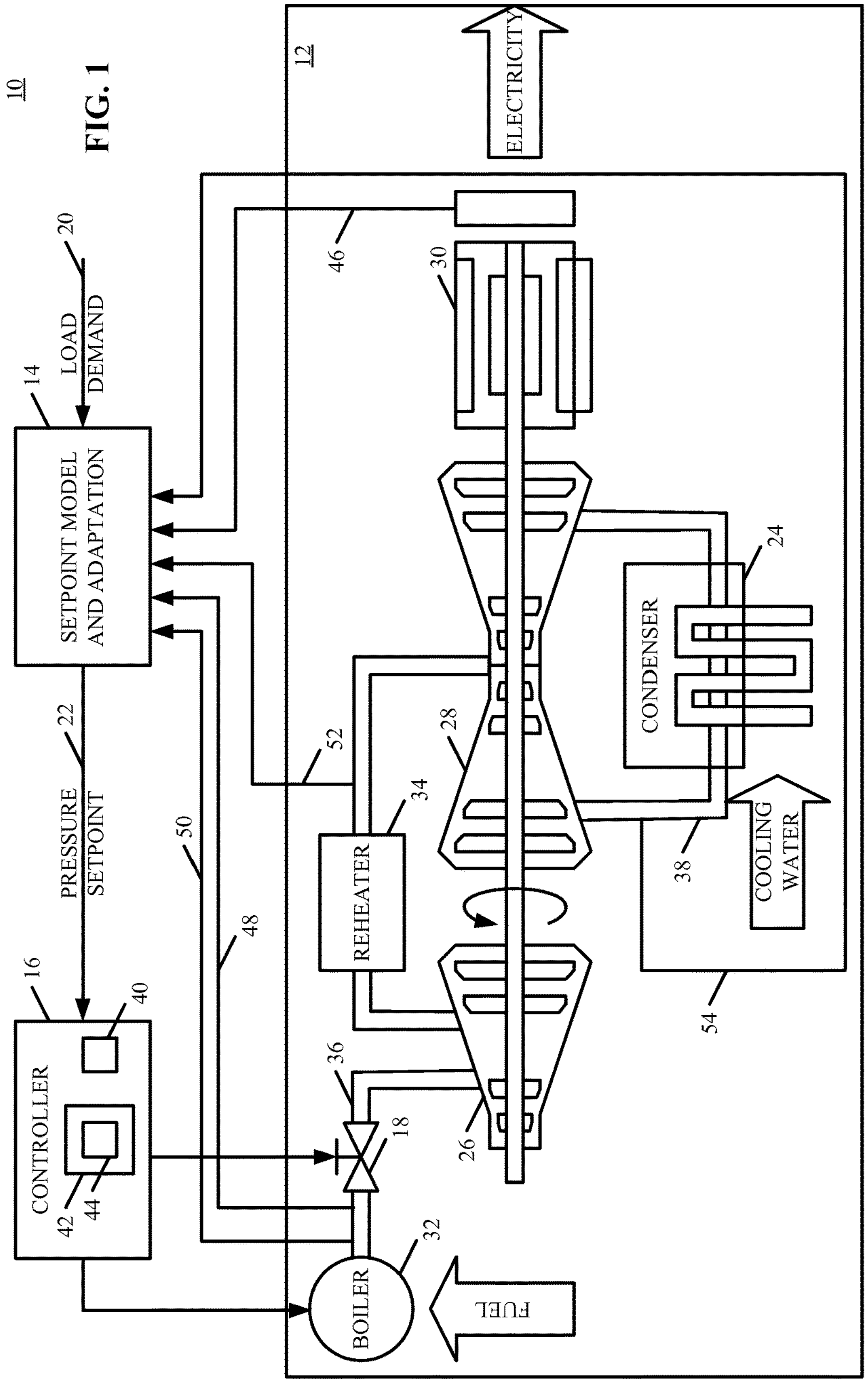
FIG. 1 illustrates a block diagram of a power plant including steam turbine power generation equipment.

Referring now to FIG. 1, a steam turbine-based power generation system and process 10, in which the control routine described in more detail herein can be used, includes a set of steam turbine power generation equipment 12 (e.g., a steam turbine system or a steam turbine power generation unit), a steam pressure set-point model and adaptation unit 14 and a controller 16 which functions to control the operation of both the steam turbine power generation equipment 12 via a steam turbine throttle control valve 18 so as to produce a output load based on a load demand signal 20 (MW) provided to the set-point model and adaptation unit 14. The set-point model and adaptation unit 14, in turn, produces a turbine steam inlet pressure set-point signal 22 based on the load demand signal 20 which is provided to the controller 16. As will be understood, the steam turbine power generation equipment 12 may include any number of sets of power generating equipment such as condensers 24, steam turbines 26, 28 for producing motive force (rotational force) from steam, electrical generators 30 for producing power from the motive force, a heat source such as a boiler 32, and pipes and ducts, as well as other equipment, interconnecting the condensers 24, steam turbines 26, 28, and the boiler 32. In this particular example, the steam turbines 26, 28 include a first, typically high pressure, steam turbine 26 and a second, typically low pressure, steam turbine 28. The steam exiting the first steam turbine 26 may be reheated in a reheater 34, which may include one or more subsections, and the reheated steam may be then provided to the second steam turbine 28.

As will be understood, the equipment upstream of the steam turbines 26, 28 may be considered to be turbine steam inlet equipment 36 (also referred to as a throttle valve) and steam may be exhausted from the steam turbines 26, 28 to one or more condensers 24 via steam outlet equipment 38. Likewise, as understood by those of ordinary skill in the art, the steam turbine power generation equipment 12 may include various valves, sprayers, etc. which may be connected to the controller 16, and used by the controller 16 to control the operation of the turbine throttle valve 18, steam turbines 26, 28, reheater 34, condenser 24, etc. Of course, fuel flow controllers (e.g., gas valves or coal feeders) for the boiler 32 in such a system may also be connected to and controlled by the controller 16, and thus the boiler 32 is a variable control device. For example, the boiler 32 may include a combustion chamber coupled to a fuel flow control valve which is controlled by the controller 16 so as to control the flow of fuel (e.g., natural gas) into the combustion chamber to thereby control the power output of the steam turbines 26, 28.

As will be understood, the controller 16 may be implemented as any desired type of process controller hardware and/or software. In particular, the controller 16 may be configured or programmed to implement the control routines, schemes or techniques described herein in any desired manner. In one case, the controller 16 may include a general purpose processor 40 and a memory 42 which stores one or more control routines 44 therein as control or programming modules to be executed or implemented by the processor 38. The processor 38 may then implement the one or more control or programming modules 44 to become a specific processor that operates in the manner described herein to implement control of the steam turbine-based power generation system and process 10. In another case, the processor 40 may be in the form of an application specific integrated circuit (ASIC) and programmed with the program modules 44 as stored in a memory 42 of the ASIC to implement the control techniques described herein.

In a standard control system for a steam turbine-based power generation system and process, such as that of the form illustrated in FIG. 1, the steam valves of the steam turbine generation equipment (e.g., the turbine throttle valve 18) are often run or placed in a wide open (fully open) condition to minimize efficiency losses in the steam turbine cycle. This is understood as sliding pressure mode, whereby the controller 16 does not use these control valves to control the operation of the steam turbines 26, 28, but instead controls the fuel flow into the boiler combustion chamber to control or effect the operation of the steam turbine cycle. As a result, load control on many power plants tends to be implemented using loop control systems, wherein a change in the electrical energy load demand is sent directly to the controllers. More specifically, a change in the load demand causes the controller 16 to control the fuel input in order to control the turbine steam inlet pressure (also referred to as throttle pressure) to a desired set-point. The controllers are initially calibrated according to the design condition for the steam turbine-based power generation system and process, and at a given operating point (i.e., the rated condition), controlling the turbine steam inlet pressure is considered equivalent to controlling the electrical energy load due to the one-to-one relationship between turbine steam inlet pressure and electrical energy load.

However, the actual process does not always operate at the rated condition (or any other fixed condition), because turbine steam inlet temperature and turbine exhaust pressure can deviate significantly from the design condition. In order to address these changes, the set-point model and adaptation unit 14 may be used to modify the original turbine steam inlet pressure/electrical energy load curve (also referred to as a "pressure-MW curve") representing the relationship between the turbine steam inlet pressure and the electrical energy load. The set-point model and adaptation unit 14 may modify the original pressure-MW curve using a correction formula from the turbine manufacturer (also referred to as a manufacturer-supplied correction function or curve), a multivariate linear regression model or a neural network model. The neural network model, in particular, typically provides a more accurate curve fitting method to the actual pressure-MW relationship than the manufacturer-supplied correction functions or the multivariate linear regression model. Using one of these three techniques, the set-point model and adaptation unit 14 derives the desired turbine steam inlet pressure set-point 22 from the electrical energy load set-point 20, and provides the pressure set-point 22 to the controller 16, which uses the pressure set-point 22 to control the combustion chamber of the burner 32 thereby controlling the steam pressure at the turbine steam inlet 36, and, in turn, the electrical energy load.

The set-point model and adaptation unit 14 monitors the steady-state difference between the actual electrical energy load (MW) 46 from the electrical generator(s) 30, and the electrical energy load demand 20 (e.g., an electrical energy load set-point). The steady-state can be considered as the operating point where the actual electrical energy load reaches the target electrical energy load and stays at a constant value for a particular amount of time. The steady-state difference between the actual electrical energy load 46 and the electrical energy load set-point 20 can be considered the degree to which the relationship between the turbine steam inlet pressure and the electrical energy load has changed. If the steady-state difference is more than a predefined threshold, the set-point model and adaptation unit 14 may train, test and select a new model to compute the desired turbine steam inlet pressure set-point 22 for the controller 16 based on the electrical energy load set-point 20, turbine steam inlet temperature 50 (also referred to as superheat temperature) deviation at the turbine steam inlet 36, reheat temperature 52 deviation at the reheater 34, exhaust pressure (also referred to as condenser back pressure) 54 deviation at the condenser 24, and auxiliary steam flow 48. The turbine steam inlet temperature 50, reheat temperature 52 and exhaust pressure 54 may all be measured from the system 10 using sensors which are well-understood by those of ordinary skill in the art. The electrical energy load set-point 20, actual electrical energy load 46, turbine steam inlet temperature 50 deviation, reheat temperature 52 deviation, exhaust pressure 54 deviation, and auxiliary steam flow 48 are also provided as inputs for the selected model in order to predict the turbine steam inlet pressure needed to meet the electrical energy load set-point 20 and derive the turbine steam inlet pressure set-point for the controller 16.

Figure 2:
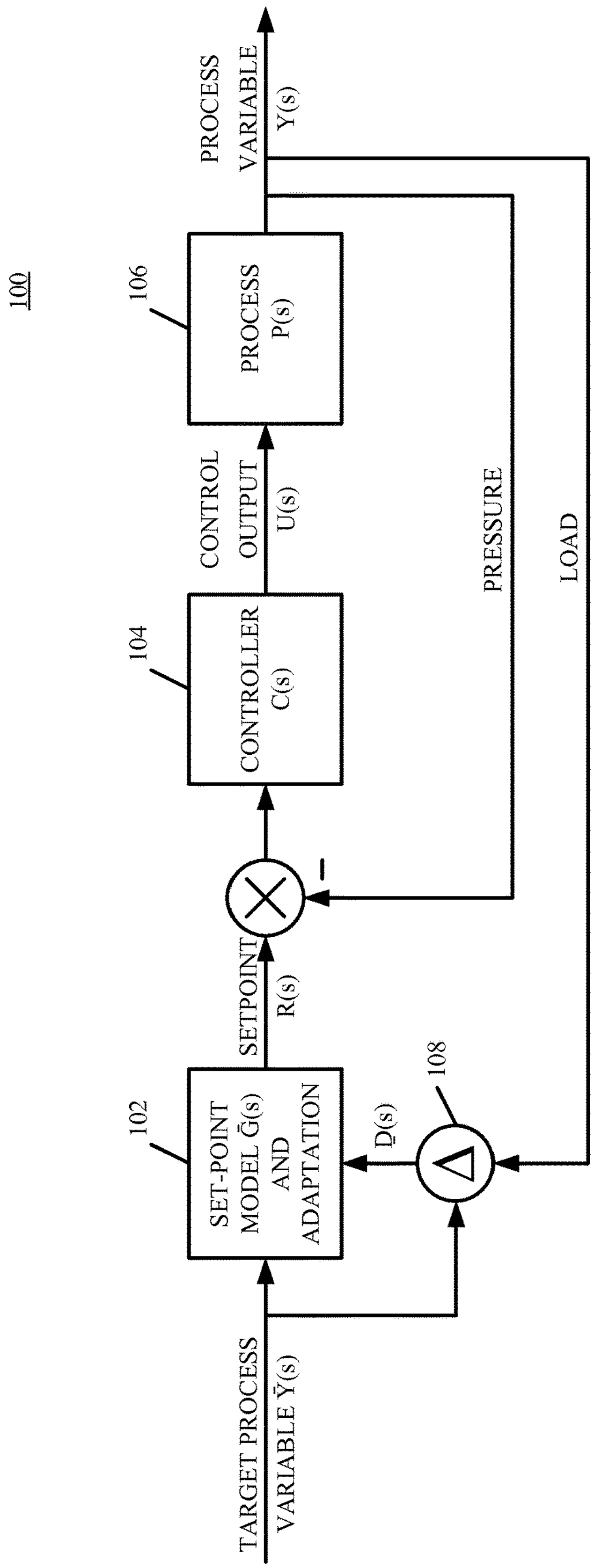
FIG. 2 illustrates a block diagram of a closed loop control system using internal model control and adaptation to control a process.
Figure 3:
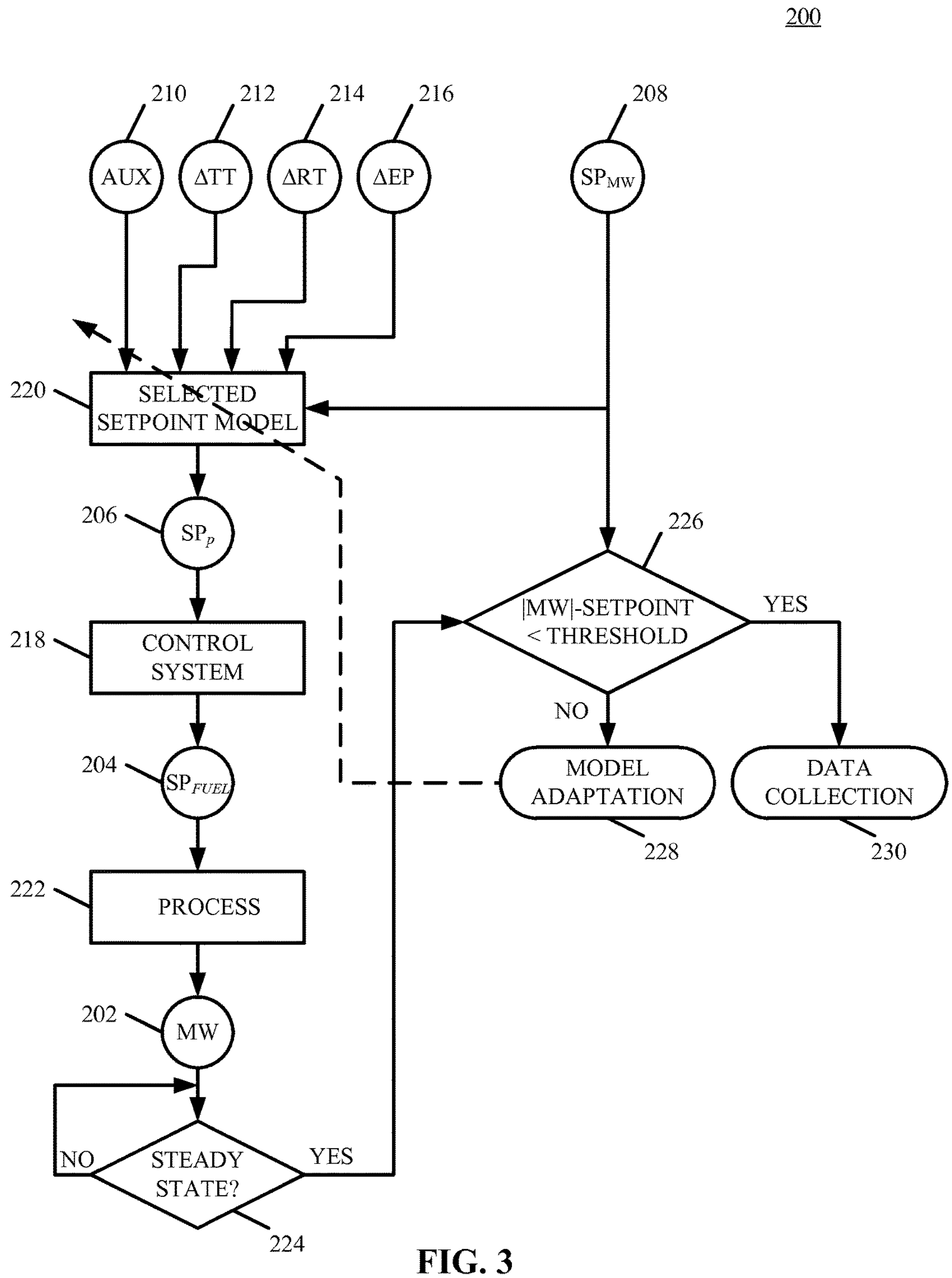
FIG. 3 illustrates a block diagram of a control routine that may be used in the closed loop control system of FIG. 2 to provide enhanced control over a power plant including steam turbine power generation equipment.
Figure 4:
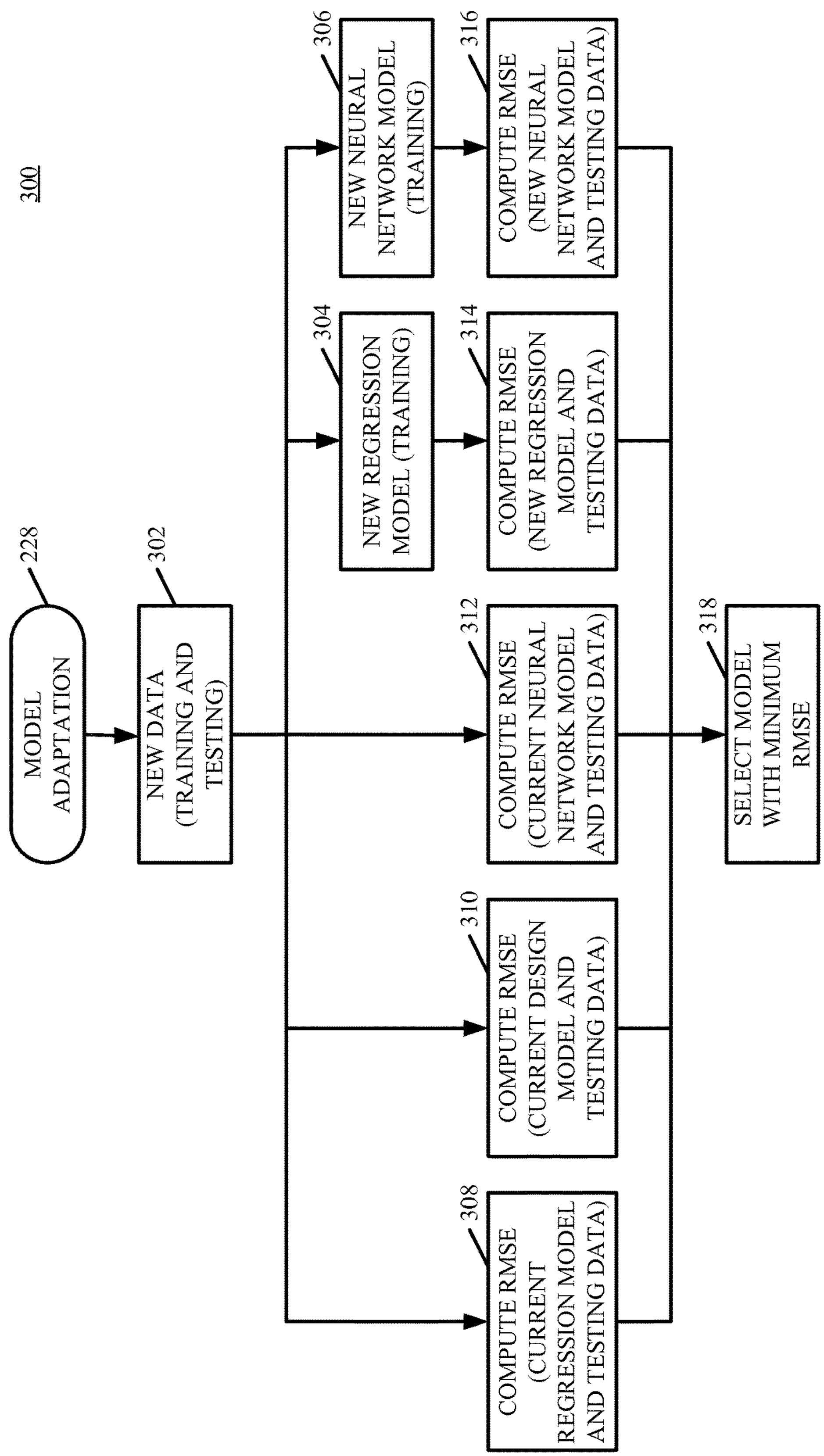
FIG. 4 illustrates a block diagram of a model adaptation routine that may be used with the control routine of FIG. 3 to provide enhanced curve fitting methods between turbine steam inlet pressure and electrical energy load.

FIGS. 2-4 illustrate a set of set-point model and control systems, routines, schemes and techniques that can be used to control the steam turbine-based power generation system and process 10 of FIG. 1 in sliding pressure mode in a manner that provides better and more accurate control over the electrical energy output load as it relates to the electrical energy set-point in response to controlling the steam pressure at the turbine steam inlet 32. A closed loop control system 100 depicted in FIG. 2 illustrates the general form of a set-point model and control system. In particular, the control system 100 of FIG. 2 includes a set-point model and adaptation unit 102 (which may be the set-point model and adaptation unit 14 of FIG. 1) that produces a set-point signal R(s) (e.g., turbine steam inlet pressure set-point 22). The set-point signal R(s) operates to effect a controller 104 (which may be the controller 16 of FIG. 1) based on a target process variable $\overline{Y}(s)$ (e.g., load demand 20) for a process 106 (which may be the same as the steam turbine-based power generation system and process 10 of FIG. 1). The controller 104 produces a control signal U(s) (e.g., controller input signal to a fuel flow control valve of the boiler 32) that operates to control the process 106. In particular, the control signal U(s) controls some device or devices within the process 106 to effect, and thereby control, the process variable Y(s) (e.g., actual electrical energy load). A summing unit 108 determines the error $\underline{D}(s)$ between the process variable Y(s) and the target process variable $\overline{Y}(s)$ as inputted to the set-point model and adaptation unit 102. The error $\underline{D}(s)$, which is a function of (and represents) a modeling error in the set-point model, is then fed back to the set-point model and adaptation unit 102.

If the model $\overline{G}(s)$ of the set-point model and adaptation unit 102 is a perfect representation of the relationship between the set-point R(s) and the process variable Y(s), then the output of the summer 108 $\underline{D}(s)$ will be equal to zero, and the control loop of FIG. 2 simply reduces to an ideal open loop control system. However, as this situation is rarely the case, the model $\overline{G}(s)$ can be adapted as discussed below to more accurately represent the relationship between turbine steam inlet pressure and electrical energy load.

FIG. 3 depicts a block diagram of a new load control scheme 200. The actual electrical energy load (MW) 202 output by a steam turbine-based power generation system and process is the process variable Y(s) of FIG. 2 (that is, the controlled variable of the control scheme), the fuel input set-point ($SP_{FUEL}$) 204 (e.g., a signal to a fuel flow control valve of the boiler 32) is the controller output U(s) of FIG. 2, the turbine steam inlet pressure set-point ($SP_p$) 206 is the set-point R(s) of FIG. 2, and the electrical energy load set-point ($SP_{MW}$) 208 (that is, the electrical energy load demand) is the target process variable $\overline{Y}(s)$ of FIG. 2. As will be understood, the electrical energy load set-point 208 is the total MW (power) to be generated by the turbine(s) (e.g., the turbines 26, 28 of FIG. 1). On units with multiple turbines, this demand may be distributed in any known or desired manner for a combined turbine MW (power). As will also be understood, the actual electrical energy load 202 output is the measured, instantaneous output of the steam turbine(s) as may be measured at the electrical generator 30. The control scheme 200 uses the measured, instantaneous output of the steam turbine(s) 202 as an input. Additionally, the control scheme uses the electrical energy load set-point 208 as an input, along with auxiliary steam flow (AUX) 210, turbine steam inlet temperature correction/deviation (ΔTT) 212, reheat temperature correction/deviation (ΔRT) 214 and exhaust pressure correction/deviation (ΔEP) 216.

Moreover, the control scheme 200 of FIG. 3 includes a control system 218 having a controller, which may be any desired type of general controller (such as a model predictive controller, proportional-integral-derivative (PID) controller, etc.), and a model system having a set-point model unit 220 that implements a predictive model of the actual electrical energy load 202. The set-point model unit 220 models the relationship between the actual electrical energy load 202 and the turbine steam inlet pressure in order to compute the turbine steam inlet pressure set-point 206 based on the electrical energy load set-point 208, auxiliary steam flow (AUX) 210, turbine steam inlet temperature correction/deviation 212, reheat temperature correction/deviation 214 and exhaust pressure correction/deviation 216. Thus, the model system, and, in particular, the set-point model unit 220, operates to predict the electrical energy load of the steam turbine process 222 in response to changes in the turbine steam inlet pressure. In one example, the turbine steam inlet pressure set-point 206 is a turbine steam inlet pressure deviation (i.e., the desired change in turbine steam inlet pressure to adjust the actual electrical energy load 202). As discussed further below, the model used in the set-point model unit 220 may involve an artificial neural network, multivariate linear regression, manufacturer-supplied correction function, or other desired techniques.

During operation, the control scheme 200 of FIG. 3 may continuously monitor the actual electrical energy load 202 (block 224) to determine whether the operating point is in a steady-state, where the actual electrical energy load 202 reaches the electrical energy load set-point ($SP_{mw}$) 208 and stays at a constant value for a given amount of time. If the system is in a steady-state, the control scheme 100 may continually monitor the steady-state difference between the actual electrical energy load 202 and the electrical energy load set-point 208 (block 226). Differences between the actual electrical energy load 202 and the electrical energy load set-point 208 may be indicative of a change in the process 222 such that the selected set-point model of the set-point model unit 220 no longer accurately models the relationship between the actual electrical energy load and the turbine steam inlet pressure. Thus, if the difference is more than a pre-defined threshold (e.g., 1 MW or any other acceptable difference), a set-point model adaptation process may be activated (block 222) in order to train, test and select a new set-point model to compute the desired turbine steam inlet pressure set-point 206 for the control system 218 based on the electrical energy load set-point 208, auxiliary steam flow 210, turbine steam inlet temperature correction/deviation 212, reheat temperature correction/deviation 214 and exhaust pressure correction/deviation 216. Otherwise, the set-point model remains active and the control scheme 200 may continue to collect data on the electrical energy load, turbine steam inlet pressure, auxiliary steam flow 210, turbine steam inlet temperature correction/deviation 212, reheat temperature correction/deviation 214, exhaust pressure correction/deviation 216, and other process control data (block 230) for training and testing models during the model adaptation process 228. In this example, the set-point model unit 220 executes the model adaptation process 228.

FIG. 4 depicts a block diagram of an exemplary new model adaptation routine 300. The model adaptation routine 300 is instantiated when the difference between the actual electrical energy load 202 and the electrical energy load set-point 208 is more than the pre-defined threshold, as such a difference may be indicative of the selected set-point model in the set-point model unit 220 no longer accurately modeling the relationship between the electrical energy load and the turbine steam inlet pressure. Generally speaking, the model adaptation scheme 300 trains and tests different models to determine which model best approximates/predicts the relationship between the actual electrical energy load as the output process variable and the turbine steam inlet pressure as the input process variable, and then selects that model to produce the turbine steam inlet pressure set-point ($SP_p$) for input to the control system 218 based on a given electrical energy load set-point ($SP_{MW}$) 208 in the control scheme 200. More particularly, the model adaptation routine 300 trains and tests neural network models in addition to the more conventional multivariate linear regression models and manufacturer-supplied correction functions. Those of ordinary skill in the art will understand that other models, either in place of, or in addition to, the multivariate linear regression model, may be utilized.

Beginning at block 302, in order to train and test the models, the model adaptation routine 300 collects data from the process 222, which may be from the data collection 230 of the control scheme 200. The newly-acquired process data may be combined or otherwise mixed together with older process data in order to form a new data set. The combined data set may be divided into two subsets—one subset for training new models, and another subset for testing both new and current models to identify the model that best approximates the relationship between the turbine steam inlet pressure and the actual electrical energy load.

At blocks 304 and 306, respectively, the model adaptation routine 300 trains a new multivariate linear regression model and a new neural network model using the subset of process data for training. Generally speaking, however, a new neural network model of the relationship between the turbine steam inlet pressure and the actual electrical energy load is considered to be the most accurate (and therefore best), as demonstrated further below. However, there are situations in which another model may more accurately describe this relationship, and therefore produces a better turbine steam inlet pressure set-point ($SP_p$) for input to the control system 218. As such, the model adaptation routine 300 trains not only the new neural network model 306, but also the new multivariate linear regression model 304. In addition, the model adaptation routine 300 tests the accuracy of not only the new neural network model and the new multivariate linear regression model, but also the current (previous) neural network model, the current (previous) multivariate linear regression model and the manufacturer-supplied correction functions.

Specifically, referring to blocks 308, 310, 312, 314, 316, respectively, each of the current multivariate linear regression model, the manufacturer-supplied correction function, the current neural network model, the new multivariate linear regression model and the new neural network model are tested using the subset of process data for testing. While different error methods may be used, in this example a root-mean-square error (RMSE) is applied, in which the difference between a value predicted by each model and the actual measured value is measured. The model that produces the minimum root-mean-square error is selected at block 318 for the set-point model unit 220.

As mentioned, while a neural network model of the relationship between the turbine steam inlet pressure and the actual electrical energy load is considered to be more accurate over the manufacturer-supplied correction function and multivariate linear regression models, and presumed to be more accurate than the current neural network model on account of being trained with more recent process data, there are instances in which one of the other models has a lower RMSE. For example, the subset of process data for training may not cover the entire range (spectrum) of operation of the process. As such, the process data for training the new neural network model at block 306 is considered incomplete. Consequently, the new neural network model is not trained properly, even though neural network models will almost always fit better with the training data than the multivariate linear regression model and manufacturer-supplied correction function. More particularly, a neural network is almost always the better model as compared to, for example, the new multivariate linear regression model trained with the same data. That is, the neural network more closely fits with the training data than the multivariate linear regression model. However, the new neural network is actually over-fitted to the training data during training at block 306 if the training data does not cover enough operational states of the process. This may not be optimal when using the new neural network model to predict the relationship between the turbine steam inlet pressure and the electrical energy load, because the training data is incomplete in that it does not cover all operational states of the process. As such, the new neural network model may not necessarily be better with the testing data, which is revealed with the RMSE. Thus, the new multivariate linear regression model, the current neural network model, the current multivariate linear regression model and/or the manufacturer-supplied correction function may have a lower RMSE than the new neural network model. For example, if the process is still close to the rated condition and equipment operating points do not drift significantly, even the manufacturer-supplied correction function may be a better representation of the relationship between the turbine steam inlet pressure and the actual electrical energy load.

Figure 5:
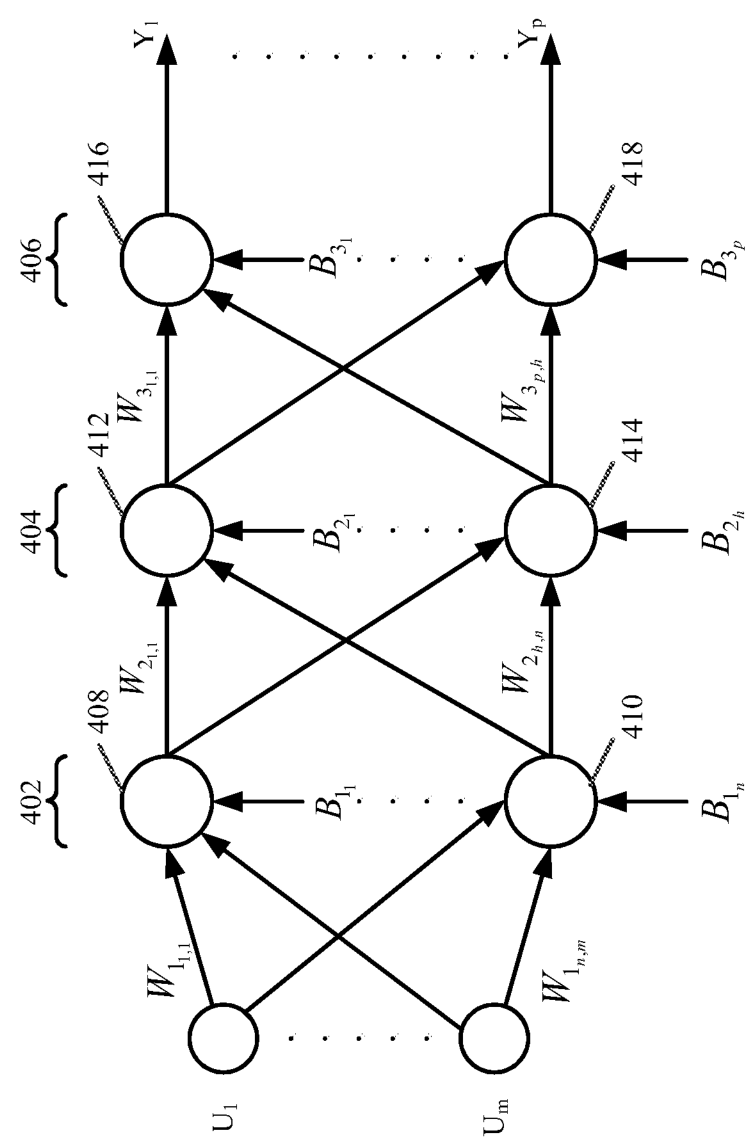
FIG. 5 illustrates a multi-layer feedforward neural network model that may be used with the control routine of FIG. 3 and/or as part of the model adaptation routine of FIG. 4.

FIG. 5 depicts a structure of an exemplary multilayer neural network model 400 utilizing a three layer artificial neural network. Each neuron in the neural network is an artificial node (also understood as a computational unit or processing unit), that receives one or more inputs, sums the inputs, and passes the sums through a transfer function to produce an output. The transfer function (also referred to as an activation function) enhances or simplifies the network containing the neuron depending on the type of transfer function utilized. The transfer function of a neuron may be, for example, a step function, a linear combination (e.g., the output is the sum of the weighted inputs plus a bias) or a sigmoid.

Each neuron is biased, and each connection (e.g., an input to a neuron) is weighted, where the biases and weights are adaptable such that they can be tuned by a learning/training algorithm, such as a back-propagation algorithm. For example, when training the neural network model 400 at step 306 of FIG. 4, the value of the output of each neuron may be compared with the actual, correct value to determine an error, and the error is fed back through the neural network. The learning algorithm adjusts the weights of the connections to reduce the value of the error, and after a sufficient number of training cycles, the neural network approaches a state where the errors are small enough such that the neural network is considered "trained".

As seen from the directional arrows in FIG. 5 depicting the connections, the artificial neural network is a feedforward neural network, meaning that each neuron in a layer has directional connections to neurons of a subsequent layer. As such, unlike other neural networks (e.g., recurrent neural networks), information in a feedforward neural network only moves in one direction from the input layer to the output layer without forming a directional cycle or loop within the network.

A multilayer feedforward neural network model may be used to fit an arbitrary and continuous nonlinear function. As such, the multilayer feedforward neural network model 400 of FIG. 5 may be used to represent a dynamical process system, and, in particular, the relationship between the turbine inlet steam pressure and the electrical energy load. Although the following is an example of a three-layer feedforward neural network model with two hidden layer, those of ordinary skill in the art will understand that neural network models having more or fewer layers, and particularly, more or fewer hidden layers, may be used. For example, when a two-layer model structure is utilized, the second layer becomes the output layer with a linear transfer function for each neuron in the output layer. Further, those of ordinary skill in the art will understand that neural networks other than feedforward neural networks may be utilized and different learning techniques may be utilized.

Referring to FIG. 5, the multilayer feedforward neural network model 400 includes an input layer 402 (the first hidden layer), a hidden layer 404 (the second hidden layer) and an output layer 406. Each layer 402, 404, 406 may include a number of neurons 408-418. In the example shown in FIG. 5, the first (input) layer 402 includes n neurons, the second (hidden) layer 404 includes h neurons and the third (output) layer 406 includes p neurons. The first (input) layer 402 and second (hidden) layer 404 neurons are tangent hyperbolic sigmoids, and the third layer (i.e., output layer 406) neurons are linear. Accordingly, each neuron 1-*n* and 1-*h* for the first and second layer neurons 408-414 applies a sigmoid transfer function represented by:

$$f(x) = \frac{1-e^{-2x}}{1+e^{-2x}}$$

where x is the input to the neuron. The each neuron 1-*p* in the third (output) layer neurons 416, 418 applies a linear transfer function.

The number of inputs to the first (input) layer 402 is assumed to be m, and the number of outputs of the neural network is the same as the number of neurons in the third (output) layer 406, namely h. Weights and biases in the i-th layer are represented by $W_i$ and $B_i$, respectively, and the output of the i-th layer is denoted by $Z_i$. Again, the weights $W_i$ of the connections and the biases $B_i$ of the neurons are adaptable such that they can be tuned by a learning/training algorithm so as to incrementally adjust the weights and biases during training to gradually reduce the error between the output of the neuron and the actual value. Based on the above, the artificial neural network outputs for three layers 402-406 are calculated as follows:

$$\text{First (input) layer 402: } Z_{1_j} = f(X_{1_j}) = \frac{1-e^{-2X_{1_j}}}{1+e^{-2X_{1_j}}},$$

-continued $$(j = 1, \ldots, n)$$

$$\text{where } X_{1_j} = B_{1_j} + \sum_{k=1}^{m} W_{1_{j,k}} \cdot U_k$$

$$\text{Second (hidden) layer 404: } Z_{2_j} = f(X_{2_j}) = \frac{1-e^{-2X_{2_j}}}{1+e^{-2X_{2_j}}}$$

$$(j = 1, \ldots, h)$$

$$\text{where } X_{2_j} = B_{2_j} + \sum_{k=1}^{n} W_{2_{j,k}} \cdot Z_{1_k}$$

$$\text{Third (output) layer 406: } Z_{3_j} = X_{3_j} \quad (j = 1, \ldots, p)$$

$$\text{where } X_{3_j} = B_{3_j} + \sum_{k=1}^{h} W_{3_{j,k}} \cdot Z_{2_k}$$

As seen in FIG. 5, the inputs $U_1$-$U_m$ are provided to each of the neurons in the first (input) layer 402 with corresponding weights, $W_{1_{1,1}}$-$W_{1_{n,m}}$. Corresponding biases $B_{1_1}$-$B_{1_n}$ are provided to each neuron in the first (input) layer 402. Each neuron 1-*n* sums the weighted inputs $U_1$-$U_m$ and adds in the bias $B_{1_j}$ according to the equation for $X_{1_j}$. The weighted sum (plus bias) is then passed through the sigmoid transfer function $f(X_{1_j})$ to produce an output $Z_{1_j}$. The output $Z_{1_j}$ of each neuron 1-*n* is shown as an input to each of the neurons 1-*h* in the second (hidden) layer 404.

The inputs (connections) to each of the neurons in the second (hidden) layer 404 are weighted with corresponding weights, $W_{2_{1,1}}$-$W_{2_{h,n}}$. Corresponding biases $B_{2_1}$-$B_{2_h}$ are provided to each neuron in the second (hidden) layer 404. Each neuron 1-*h* sums the weighted inputs $Z_{1_1}$-$Z_{1_n}$ and adds in the bias $B_{2_j}$ according to the equation for $X_{2_j}$. The weighted sum (plus bias) is the passed through the sigmoid transfer function $Z_{2_j}$ to produce an output. The output of each neuron 1-*h* is shown as an input to each of the neurons 1-*p* in the third (output) layer 404.

The inputs (connections) to each of the neurons in the third (output) layer 404 are weighted with corresponding weights, $W_{3_{1,1}}$-$W_{3_{p,h}}$. Corresponding biases $B_{3_1}$-$B_{3_p}$ are provided to each neuron in the third (output) layer 406. Each neuron 1-*p* sums the weighted inputs $Z_{2_1}$-$Z_{2_h}$ and adds in the bias $B_{3_j}$ according to the equation for $X_{3_j}$. The weighted sum (plus bias) is then passed through the linear transfer function $Z_3$ to produce an output $Y_1$-$Y_p$. Again, because this is a feedforward neural network, the flow of inputs and outputs goes in one direction from the first (input) layer 402 to the third (output) layer 406 via the second (hidden) layer 404.

As previously mentioned, turbine manufacturers supply correction formulas or curves to modify the electrical energy load/steam pressure curve based on information at the time of manufacture and/or installation (i.e., also referred to as the rated condition or design). FIGS. 6-9 depict examples of manufacturer-supplied correction curves of the correlation between various process variables (i.e., turbine steam inlet pressure, turbine steam inlet temperature, reheat steam temperature, exhaust steam pressure) and the electrical energy load of the turbine(s) at the rated condition. More particularly, FIGS. 6-9 depicts the relationship between deviations in these variables and the percentage correction to the electrical energy load of the turbine(s). As such, the process variables shown in FIGS. 6-9 may correspond to the auxiliary steam flow (AUX) 210, turbine steam inlet temperature correction/deviation (ΔTT) 212, reheat temperature correction/deviation (ΔRT) 214 and exhaust pressure correction/ deviation (ΔEP) 216 shown in FIG. 3. The process variables may be measured at corresponding points within the power generation system. For example, the turbine steam inlet pressure and turbine steam inlet temperature may be measured using sensor(s) placed at the turbine steam inlet equipment 36 in FIG. 1. Likewise, reheat steam temperature may be measured using sensor(s) placed at the reheater 34, and exhaust steam pressure may be measured using sensor(s) at the condenser 24 of FIG. 1. Electrical energy load may be measured using sensors(s) at the generator 30. The turbine steam inlet pressure, turbine steam inlet temperature, reheat steam temperature, exhaust steam pressure may be provided as raw values, whereby the deviations are calculated based on comparisons against design values (ideal values) assumed at rated conditions. Alternatively, deviations may be calculated at the sensors themselves.

Figure 6:
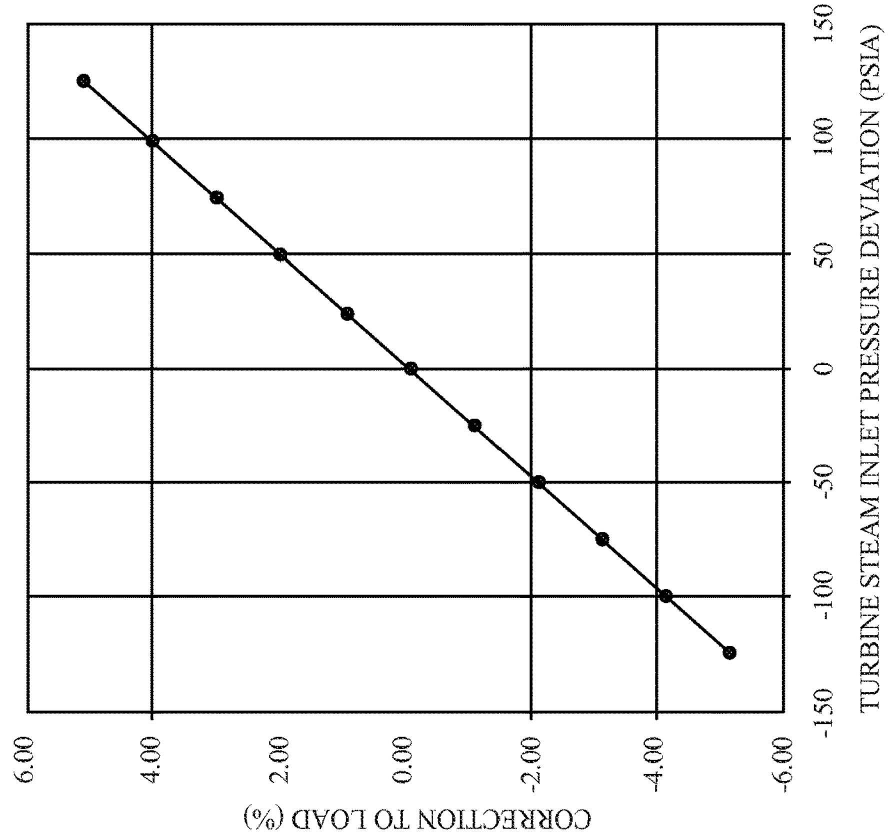
FIG. 6 illustrates an example of a manufacturer-supplied correction curve of a correlation between turbine throttle pressure deviation and electrical energy load deviation at the rated condition (design)

Referring to FIG. 6, the ideal relationship between turbine steam inlet pressure deviation and correction to the electrical energy load is linear with a zero-to-zero correction, meaning that if there is no deviation in turbine steam inlet pressure, there is no correction to the electrical energy load. Likewise, if there is no need for correction to the electrical energy load, there is no need to change the turbine steam inlet pressure (e.g., with a new set-point value). The following table depicts the values plotted in FIG. 6 for turbine steam inlet pressure (in pounds per square inch absolute), turbine steam inlet pressure deviation (in pounds per square inch absolute) and electrical energy load correction (percentage):

| Chart | | |
|---|---|---|
| Throttle Pressure (psia) | Pressure Deviation (psia) | Calculated Correction to Load (%) |
| 2290 | −125 | −5.15 |
| 2315 | −100 | −4.12 |
| 2340 | −75 | −3.09 |
| 2365 | −50 | −2.06 |
| 2390 | −25 | −1.03 |
| 2415 | 0 | 0.00 |
| 2440 | 25 | 1.03 |
| 2465 | 50 | 2.06 |
| 2490 | 75 | 3.09 |
| 2515 | 100 | 4.12 |
| 2540 | 125 | 5.15 |

Based on the above chart, and the manufacturer-supplied correction curve shown in FIG. 6, the relationship between turbine steam inlet pressure and electrical energy load can be expressed as the following linear manufacturer-supplied correction function:

$$MW_{CORR}=4.11880209\times10^{-2}\times\Delta TP+8.07434927\times10^{-17}$$

where $MW_{CORR}$ is the electrical energy load correction and ΔTP is the turbine steam inlet pressure deviation.

Figure 7:
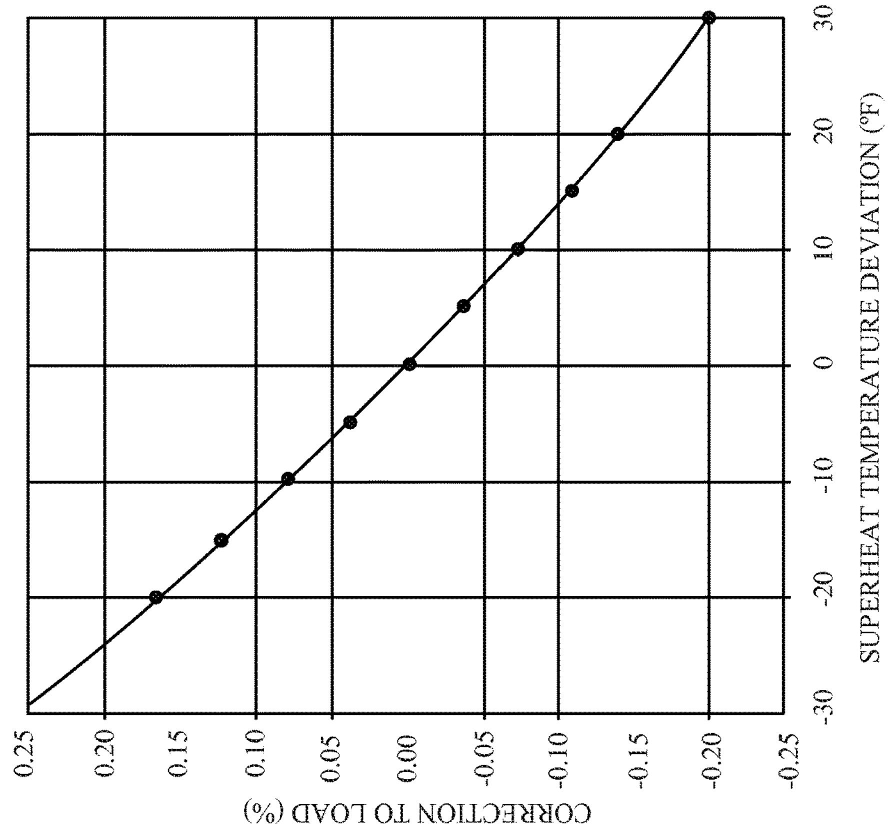
FIG. 7 illustrates an example of a manufacturer-supplied correction curve of a correlation between superheat temperature deviation and electrical energy load at the rated condition (design)

Referring to FIG. 7, the ideal relationship between turbine steam inlet temperature deviation and correction to the electrical energy load is mostly linear with a zero-to-zero correction, meaning that if there is no deviation in turbine steam inlet temperature, there is no correction to the electrical energy load. The following table depicts the values plotted in FIG. 7 for turbine steam inlet temperature (in degrees Fahrenheit), turbine steam inlet temperature deviation (in degrees Fahrenheit) and electrical energy load correction (percentage):

| Chart | | |
|---|---|---|
| Throttle Temperature (° F.) | Temperature Deviation (° F.) | Calculated Correction to Load (%) |
| 970 | −30 | 0.26 |
| 980 | −20 | 0.16 |
| 985 | −15 | 0.12 |
| 990 | −10 | 0.08 |
| 995 | −5 | 0.04 |
| 1000 | 0 | 0.00 |
| 1005 | 5 | −0.04 |
| 1010 | 10 | −0.07 |
| 1015 | 15 | −0.11 |
| 1020 | 20 | −0.14 |
| 1030 | 30 | −0.20 |

Based on the above chart, and the manufacturer-supplied curve shown in FIG. 7, the relationship between throttle steam temperature and electrical energy load can be expressed as the following quadratic polynomial manufacturer-supplied correction function:

$$MW_{CORR}=3.2279474400\times10^{-5}\times\Delta TT^2-7.5806764350\times10^{-3}\times\Delta TT+2.7061686225\times10^{-16}$$

where $MW_{CORR}$ is the electrical energy load correction and ΔTT is the turbine steam inlet temperature deviation.

Figure 8:
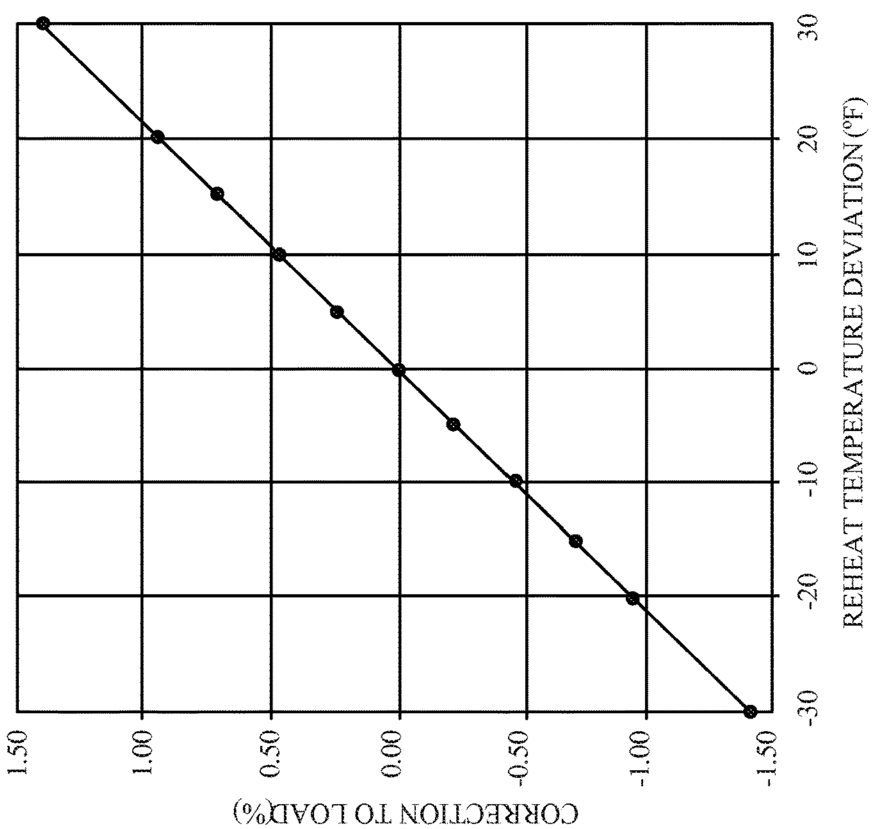
FIG. 8 illustrates an example of a manufacturer-supplied correction curve of a correlation between reheat steam temperature deviation and electrical energy load deviation at the rated condition (design)

Referring to FIG. 8, the ideal relationship between reheat temperature deviation and correction to the electrical energy load is linear with a zero-to-zero correction, meaning that if there is no deviation in reheat temperature, there is no correction to the electrical energy load. Likewise, if there is no need for correction to the electrical energy load, there is no need to change the reheat temperature. The following table depicts the values plotted in FIG. 8 for reheat temperature (in degrees Fahrenheit), reheat temperature deviation (in degrees Fahrenheit) and electrical energy load correction (percentage):

| Chart | | |
|---|---|---|
| Throttle Temperature (° F.) | Temperature Deviation (° F.) | Calculated Correction to Load (%) |
| 970 | −30 | −1.41 |
| 980 | −20 | −0.94 |
| 985 | −15 | −0.71 |
| 990 | −10 | −0.47 |
| 995 | −5 | −0.24 |
| 1000 | 0 | 0.00 |
| 1005 | 5 | 0.24 |
| 1010 | 10 | 0.47 |
| 1015 | 15 | 0.71 |
| 1020 | 20 | 0.94 |
| 1030 | 30 | 1.41 |

Based on the above chart, and the manufacturer-supplied curve shown in FIG. 8, the relationship between reheat temperature and electrical energy load can be expressed as the following linear manufacturer-supplied correction function:

$$MW_{CORR}=4.7144866112\times10^{-2}\times\Delta RT$$

where $MW_{CORR}$ is the electrical energy load correction and ΔRT is the reheat temperature deviation.

Figure 9:
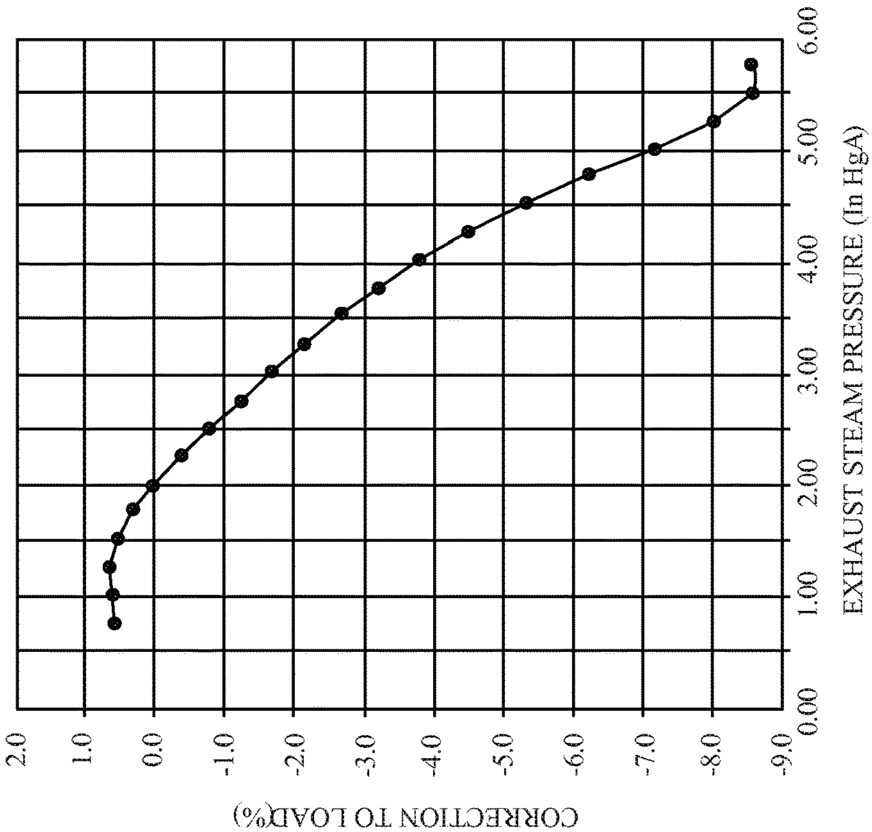
FIG. 9 illustrates an example of a manufacturer-supplied correction curve of a correlation between exhaust steam pressure and electrical energy load deviation at the rated condition (design)

Referring to FIG. 9, the ideal relationship between exhaust pressure deviation and correction to the electrical energy load is non-linear with a non-zero-to-zero correction, meaning that if there is deviation in exhaust pressure from 2 HgA, there will be correction to the electrical energy load. The following table depicts the values plotted in FIG. 9 for exhaust pressure (in inches of mercury absolute), exhaust pressure deviation (in inches of mercury absolute) and electrical energy load correction (percentage):

| Chart | | Calculated |
|---|---|---|
| Exhaust Pressure (HgA) | Exhaust Pressure Deviation (HgA) | Correction to Load (%) |
| 0.75 | −1.25 | 0.5641 |
| 1.00 | −1.00 | 0.6110 |
| 1.25 | −0.75 | 0.6175 |
| 1.50 | −0.50 | 0.5273 |
| 1.75 | −0.25 | 0.3258 |
| 2.00 | −0.00 | −0.0003 |
| 2.25 | 0.25 | −.03513 |
| 2.50 | 0.50 | −0.7740 |
| 2.75 | 0.75 | −1.2205 |
| 3.00 | 1.00 | −1.6776 |
| 3.25 | 1.25 | −2.1450 |
| 3.50 | 1.50 | −2.6349 |
| 3.75 | 1.75 | −3.1694 |
| 4.00 | 2.00 | −3.7758 |
| 4.25 | 2.25 | −4.4782 |
| 4.50 | 2.50 | −5.2876 |
| 4.75 | 2.75 | −6.1888 |
| 5.00 | 3.00 | −7.1249 |
| 5.25 | 3.25 | −7.9792 |
| 5.50 | 3.50 | −8.5543 |
| 5.75 | 3.75 | −8.5491 |

Based on the above chart, and the manufacturer-supplied correction curve shown in FIG. 9, the relationship between exhaust pressure and electrical energy load can be expressed as two polynomial manufacturer-supplied correction functions—a $7^{th}$ order polynomial for all values of ΔEP (exhaust pressure deviation) less than 1.8 or more than 2.2, and a quadratic polynomial for all values of ΔEP (exhaust pressure deviation) between 1.8 and 2.2:

$$(<1.8 \text{ or } >2.2.)\text{: } MW_{CORR}=1.47319648\times10^{-2}\times\Delta EP^6-2.54188394\times10^{-1}\times\Delta EP^5+1.68473428\times\Delta EP^4-5.36131007\times\Delta EP^3+7.93422272\times\Delta EP^2-5.17916170\times\Delta EP+1.77192554$$

$$(1.8 \text{ to } 2.2)\text{: } MW_{CORR}=-1.92996710\times10^{-1}\times\Delta EP^2--6.84832910\times10^{-1}\times\Delta EP+2.14131652$$

Figure 10:
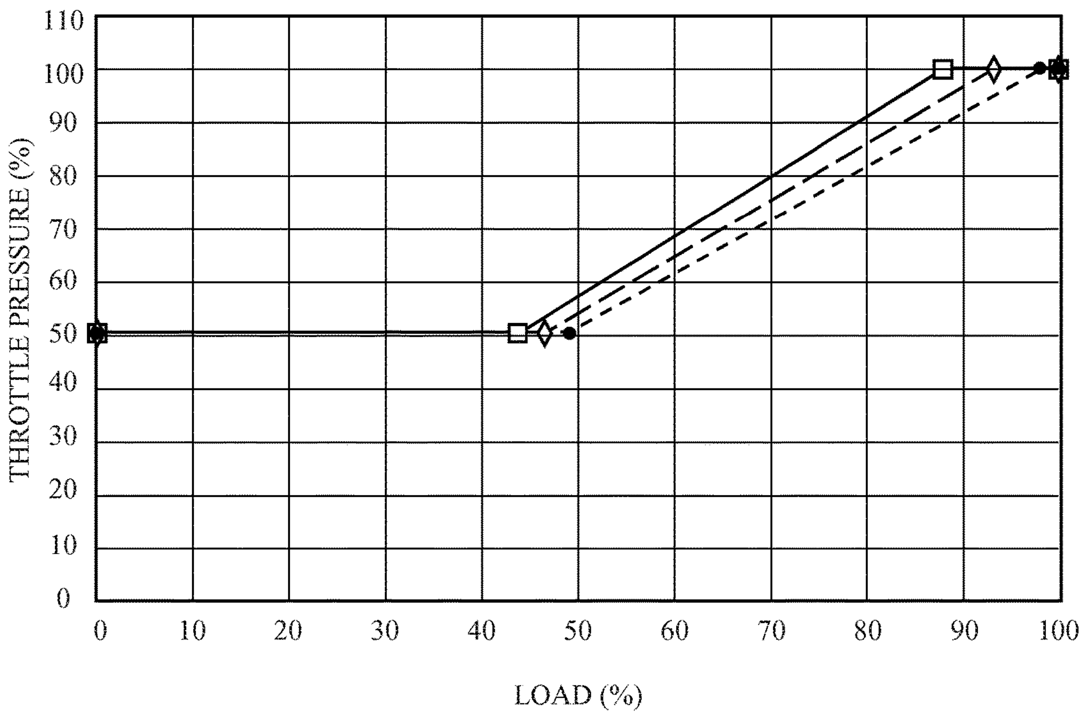
FIG. 10 illustrates an example of a shift in a curve of the relationship between throttle pressure and electrical energy load over time in accordance with operational needs in sliding pressure control mode.

Over time, the unit process characteristics may change slightly, such that the above manufacturer-supplied correction curves and corresponding functions are no long applicable or representative of the relationships between the various process variables (i.e., turbine steam inlet pressure, turbine steam inlet temperature, reheat steam temperature, exhaust steam pressure) and the electrical energy load of the turbine(s). For example, FIG. 10 illustrates a shift in the curve of the relationship between turbine steam inlet pressure and electrical energy load over time in accordance with operational needs in sliding pressure control mode. In this example, the steam turbine throttle control valve 18 is kept wide open (100%), while the boiler 32 (fuel input) is used to control the turbine steam inlet pressure to a desired set-point, which is a function of the electrical energy load. As turbine steam inlet pressure and electrical energy load have a direct, one-to-one relationship at a given operating point as shown from FIG. 6, controlling the turbine steam inlet pressure is equivalent to controlling the electrical energy load, as represented by the curve in FIG. 10. As seen from FIG. 10, the turbine steam inlet pressure is held constant when the electrical energy load is below approximately 40-45%, and the turbine steam inlet pressure increases gradually as the electrical energy load increases above 40-45%. This part of the curve is the sliding pressure curve, and may be moved left or right with calibration to reflect changes in the relationship between the turbine steam inlet pressure and the electrical energy output over time, as depicted by the three lines. Thus, the slope of the sliding pressure curve may be shifted slightly left or right according to operational needs, and the electrical energy load and turbine steam inlet pressure relationship needs to be re-calibrated from time-to-time.

A prototype neural network model in accordance with the above disclosure was trained and used to model the relationship between the turbine steam inlet pressure and the electrical energy load. In particular, the neural network model involved a three layer, feedforward neural network (i.e., an input layer, one hidden layer and an output layer with information flowing in only one direction from the input layer to the output layer via the hidden layer), where the hidden layer comprised six sigmoid-type neurons. The representative data was selected from a 450 MW steam turbine-based power generation system and process over a one year time period, thereby providing sufficient training data for the neural network model so as to cover an entire range (spectrum) of operation of the process. A multivariable linear regression model was likewise trained with the same process data. The data fitting results of the neural network model were compared to the data fitting results of the multivariable linear regression model and the manufacturer-supplied correction functions according to the design of the steam turbine-based power generation system and process. The data fitting results are shown in FIGS. 11-13.

Figure 11:
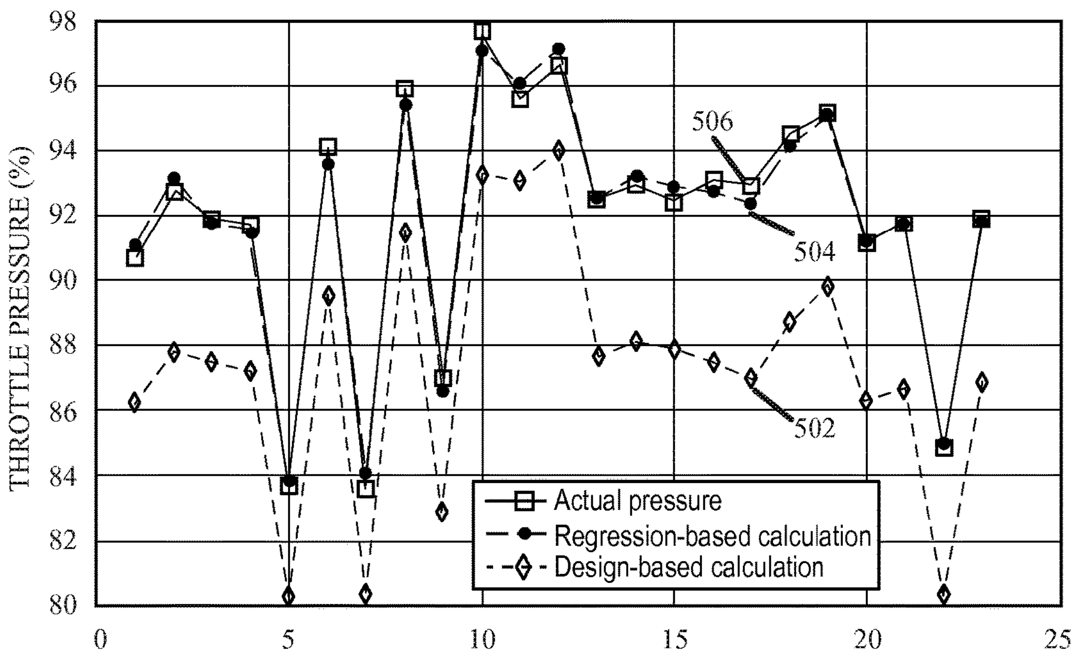
FIG. 11 illustrates a comparison of predicted turbine steam inlet pressure (throttle pressure) as determined from a manufacturer-supplied correction function and a multivariate linear regression model as it relates to the actual steam pressure.

Referring to FIG. 11, the predicted turbine steam inlet pressure according to the manufacturer-supplied correction function 502 (shown as the plot with diamond-shaped plot points) and the predicted turbine steam inlet pressure according to the multivariate linear regression model 504 (shown as the plot with circular-shaped plot points) are compared to the actual turbine steam inlet pressure 506 (shown as the plot with the square-shaped plot points). As seen therein, the manufacturer-supplied correction function does not fit the actual turbine steam inlet pressure very well, though it does roughly track the changes in turbine steam inlet pressure as noted by the changes in slope. Nonetheless, the manufacturer-supplied correction function predictions of the turbine steam inlet pressure deviates significantly from the actual turbine steam inlet pressure resulting in a large fitting error. For example, where turbine steam inlet pressure and electrical energy load have a direct one-to-one relationship at a given operating point, it can be seen that the actual turbine steam inlet pressure 506 and the predicted pressure from the manufacturer-supplied correction function 502 differs by as much as 6 percentage points, meaning that the electrical energy output differs by as much as 6 percentage points. In a 450 MW turbine-based power generation system and process, this may translate to a difference of as much as 27 MW, meaning that if the electrical energy load demand is 418.5 MW (i.e., the electrical energy load set-point ($SP_{MW}$) is 418.5 MW), the turbine steam inlet pressure set-point predicted by the manufacturer-supplied correction function 502 will result in only a 391.5 MW electrical energy load.

The multivariate linear regression model predictions, on the other hand, fit fairly closely with the actual turbine steam inlet pressure, meaning the multivariate linear regression model provides a roughly accurate prediction of the actual turbine steam inlet pressure. Nonetheless, there is some difference between the multivariate linear regression predictions of the turbine steam inlet pressure and the actual turbine steam inlet pressure resulting in a statistically significant fitting error. Again, where turbine steam inlet pressure and electrical energy load have a direct one-to-one relationship at a given operating point, it can be seen that the actual turbine steam inlet pressure 506 and the predicted pressure from the multivariate linear regression model 504 differs by as much as 0.5 percentage points, meaning that the electrical energy output differs by as much as 0.5 percentage points. In a 450 MW turbine-based power generation system and process, this may translate to a difference of as much as roughly 2.25 MW, meaning that if the electrical energy load demand is 418.5 MW, the turbine steam inlet pressure predicted by the multivariate linear regression model 504 results in a 416.25 MW electrical energy load, which is still short of the electrical energy load demand.

Figure 12:
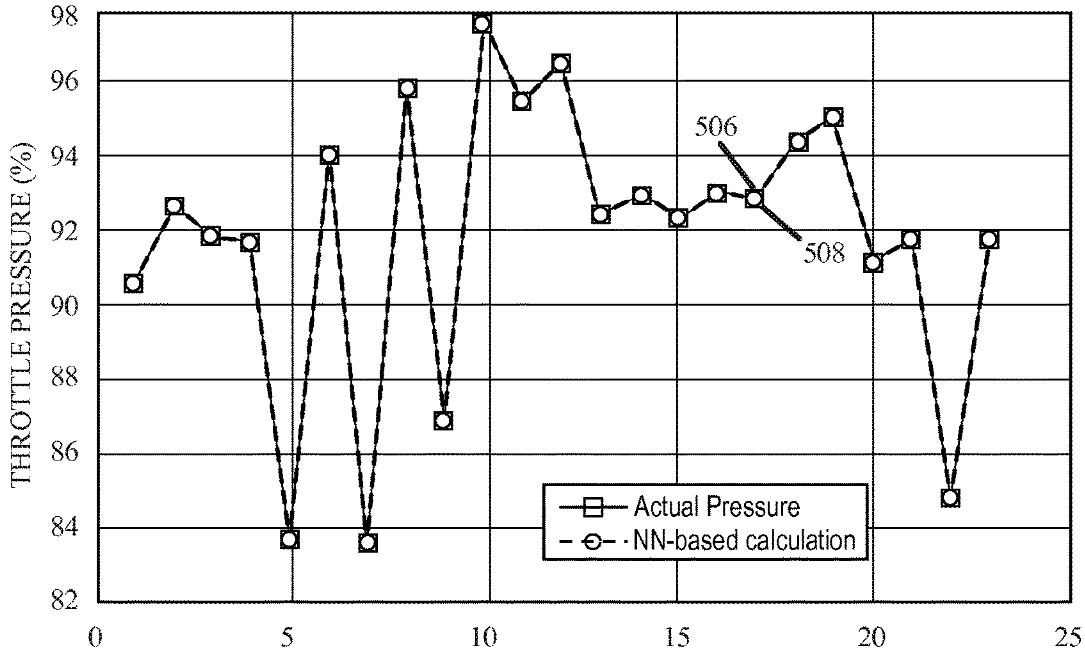
FIG. 12 illustrates a comparison of predicted turbine steam inlet pressure as determined from a neural network model as it relates to the actual steam pressure.
Figure 13:
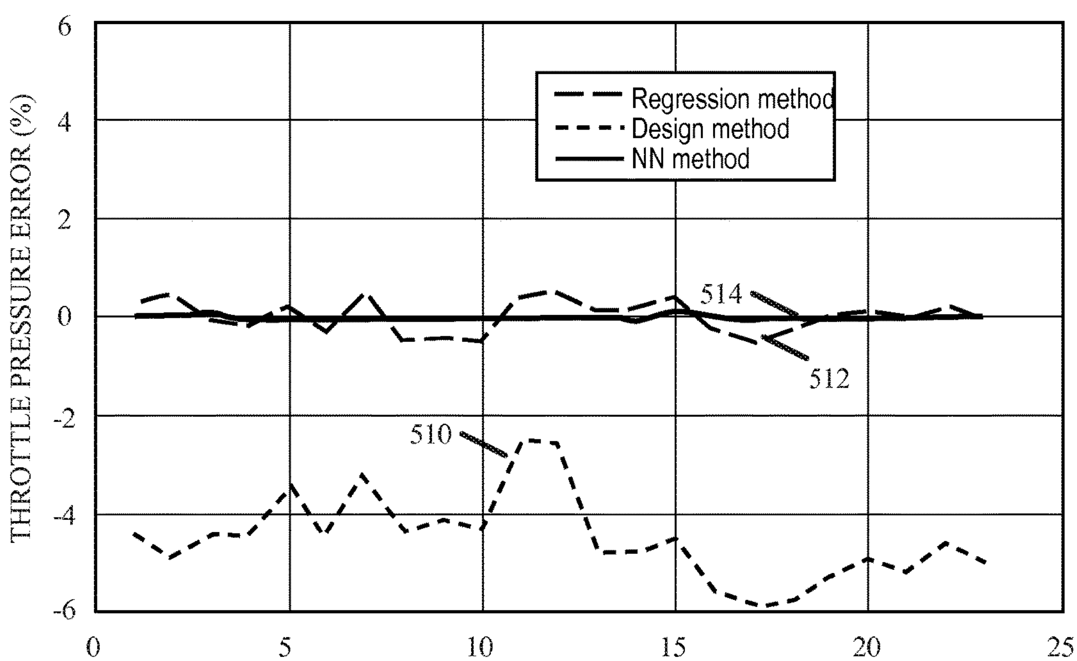
FIG. 13 illustrates a comparison of fitting errors to the actual steam pressure for a manufacturer-supplied correction function, a multivariate linear regression model and a neural network model.

Referring to FIG. 12, the predicted turbine steam inlet pressure according to the feedforward neural network model 508 (shown as the plot with circular-shaped plot points) is compared to the actual turbine steam inlet pressure 506 (shown as the plot with the square-shaped plot points). As seen therein, the feedforward neural network model 508 fits the actual turbine steam inlet pressure very well, with almost no discernible difference resulting in a negligible fitting error. Thus, in the example of a 450 MW turbine-based power generation system and process, this may translate to virtually no difference, meaning that if the electrical energy load demand is 418.5 MW, the turbine steam inlet pressure predicted by the feedforward neural network model results in an almost near-identical 418.5 MW electrical energy load. Thus, it can be easily observed that the feedforward neural network model has the smallest fitting error for all models, such as average error, root-mean-square error (RMSE), maximum and minimum absolute errors.

The fitting errors for each of the manufacturer-supplied correction function, the multivariate linear regression model and the feedforward neural network model are depicted in FIG. 13. As seen therein, the fitting error for the manufacturer-supplied correction function 510 is significant, ranging from approximately −2% to −6% as compared to the actual turbine steam inlet pressure (0% error). The fitting error for the multivariate linear regression model 512 is better, but still statistically significant, ranging from approximately +0.5% to −0.5% as compared to the actual turbine steam inlet pressure. The fitting error for the feedforward neural network model 514, on the other hand, is almost zero, and significantly better than the fitting error for the manufacturer-supplied correction function 510 and the fitting error for the multivariate linear regression model 512. The numerical comparisons of the fitting error statistics over the data range of FIG. 13 are provided in the table below:

| | Regression Model | Design Model | Neural Network Model |
|---|---|---|---|
| Average Error | 0.00274 | −4.527 | −0.0000435 |
| RMSE | 0.342 | 0.875 | 0.0351 |
| Minimum Absolute Error | 0.0302 | 2.536 | 0.003 |
| Maximum Absolute Error | 0.539 | 5.914 | 0.093 |

As seen from the chart above, the feedforward neural network model had an average error that was significantly less than both the multivariate linear regression model and the manufacturer-supplied correction function. In particular, the feedforward neural network model had an average error that was more than 60 times better than the next nearest average error (i.e., the multivariate linear regression model) Likewise, the root-mean-square error for the feedforward neural network model was significantly better than both the multivariate linear regression model and the manufacturer-supplied correction function. In particular, the feedforward neural network model had a root-mean-square error that was about 10 times better than the next nearest root-mean-square error (i.e., the multivariate linear regression model).

As it relates to the model adaptation routine 300 of FIG. 4, a comparison of the root-mean-square errors at block 318 (at least as it pertains to the newly-trained multivariate linear regression model, the newly-trained feedforward neural network model and the manufacturer-supplied correction function) would result in the selection of the newly-trained feedforward neural network model for the set-point model unit 220. This would likely be the case, given that the newly-trained feedforward neural network model had a year's worth of training data, unless for some reason either the previously-trained (i.e., current) neural network model and/or the previously-trained (i.e., current) multivariate linear regression model had a smaller RMSE.

Although the forgoing text sets forth a detailed description of numerous different embodiments of the invention, it should be understood that the scope of the invention may be defined by the words of the claims set forth at the end of this patent and their equivalents. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention. Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

The invention claimed is:

1. A power generation system, comprising:
- a steam turbine power generation unit having a turbine steam inlet system, a steam turbine coupled to the turbine steam inlet system and powered by steam from the turbine steam inlet system, and a steam outlet;
- an electrical energy generation unit mechanically coupled to the steam turbine and adapted to produce an electrical energy load based on movement of the steam turbine;
- a control system adapted to develop a process control signal to control pressure in the turbine steam inlet system to thereby control the electrical energy load produced by the electrical energy generation unit; and
- a feedforward neural network model of a relationship between turbine steam inlet pressure and the electrical energy load operatively coupled to the control system, wherein an input of the feedforward neural network model includes an electrical energy load set-point to produce a pressure set-point control system output and the pressure set-point control system output is coupled to an input of the control system.

2. The power generation system of claim 1, further comprising:
- a burner system that burns a fuel to generate steam input to the turbine steam inlet system;
- wherein the control system includes a controller input generation unit and a controller operatively coupled to the controller input generation unit, wherein the output of the feedforward neural network model is coupled to an input of the controller input signal generation unit, and the controller input signal generation unit is adapted to develop a controller input signal for the controller and the controller is adapted to develop the process control signal to control the burner system to thereby control the pressure in the turbine steam inlet system in response to the controller input signal.

3. The power generation system of claim 2, wherein the controller input signal comprises a controller valve input signal for the controller to control a turbine valve to thereby control an input of steam to the turbine steam inlet system.

4. The power generation system of claim 3, wherein the controller valve input signal comprises a value to maximize the opening of the valve to the turbine steam inlet system such that the power generation system is in a sliding pressure mode.

5. The power generation system of claim 1, further comprising:

a reheater operatively coupled to the steam turbine power generation unit to reheat steam exiting the steam turbine power generation unit and provide the reheated steam back to the steam turbine power generation unit; and a condenser operatively coupled to the steam outlet of the steam turbine power generation unit to receive steam exhausted from the steam turbine power generation unit;

wherein the feedforward neural network model comprises a multivariable input including the electrical energy load set-point, a reheat temperature deviation, a turbine steam inlet temperature deviation, a condenser back pressure deviation, and an auxiliary steam flow, wherein each of the reheat temperature deviation, the turbine steam inlet temperature deviation, the condenser back pressure deviation, and the auxiliary steam flow have an effect on the electrical energy load.

6. The power generation system of claim 1, wherein the feedforward neural network model comprises a neural network having at least one hidden layer of sigmoid-type neurons.

7. The power generation system of claim 1, further comprising a model adaptation unit that adapts a model to produce the pressure set-point control system output.

8. The power generation system of claim 7, wherein the model adaptation unit is operatively coupled to the electrical energy generation unit, wherein an input of the model adaptation unit includes the electrical energy load set-point and the electrical energy load, and wherein the model adaptation unit adapts the model based on a difference between the electrical energy load set-point and the electrical energy load.

9. The power generation system of claim 8, wherein the model adaptation unit adapts the model if the power generation system is operating in a steady-state and the difference between the electrical energy load set-point and the electrical energy load exceeds a threshold value.

10. The power generation system of claim 7, wherein the model adaptation unit is adapted to train a new feedforward neural network model of the relationship between the turbine steam inlet pressure and the electrical energy load using process data from the power generation system as training data.

11. The power generation system of claim 10, wherein the model adaptation unit is adapted to train a multivariate linear regression model of the relationship between the turbine steam inlet pressure and the electrical energy load using the training data.

12. The power generation system of claim 11, wherein the model adaptation unit is adapted to compute a root-mean-square error for each of the new feedforward neural network model and the multivariate linear regression model using process data from the power generation system as testing data.

13. The power generation system of claim 12, wherein the model adaptation unit is adapted to compute a root-mean-square error for each of the feedforward neural network model operatively coupled to the control system, a previous multivariate linear regression model of the relationship between the turbine steam inlet pressure and the electrical energy load, and a design model of the relationship between the turbine steam inlet pressure and the electrical energy load using the testing data.

14. The power generation system of claim 12, wherein the model adaptation unit is adapted to select one of the new feedforward neural network model and the multivariate linear regression model, wherein the model with the minimum root-mean-square error is selected for the power generation system.

15. The power generation system of claim 13, wherein the model adaptation unit is adapted to select one of the new feedforward neural network model and the multivariate linear regression model, the feedforward neural network model operatively coupled to the control system, the previous multivariate linear regression model and the design model based on the root-mean-square error for each model, wherein the model with the minimum root-mean-square error is selected for the power generation system.

16. The power generation system of claim 15, wherein the model adaptation unit is adapted to replace the feedforward neural network model operatively coupled to the control system if the selected model is the new feedforward neural network model, the new multivariate linear regression model, the old multivariate linear regression model or the design model.

17. A power generation system, comprising:

a steam turbine power generation unit having a turbine steam inlet system, a steam turbine coupled to the turbine steam inlet system and powered by steam from the turbine steam inlet system, and a steam outlet;

an electrical energy generation unit mechanically coupled to the steam turbine and adapted to produce an electrical energy load based on movement of the steam turbine;

a control system adapted to develop a process control signal to control pressure in the turbine steam inlet system to thereby control the electrical energy load produced by the electrical energy generation unit; and a model adaptation unit operatively coupled to the electrical energy generation unit to adapt a feedforward neural network model of a relationship between turbine steam inlet pressure and the electrical energy load using process data from the power generation system as training data, wherein the feedforward neural network model is adapted to produce a pressure set-point control system output from an electrical energy load set-point for the control system.

18. The power generation system of claim 17, wherein the model adaptation unit is operatively coupled to the electrical energy generation unit, wherein an input of the model adaptation unit includes the electrical energy load set-point and the electrical energy load, and wherein the model adaptation unit adapts models based on a difference between the electrical energy load set-point and the electrical energy load.

19. The power generation system of claim 18, wherein the model adaptation unit adapts models if the power generation system is operating in a steady-state and the difference between the electrical energy load set-point and the electrical energy load exceeds a threshold value.

20. The power generation system of claim 17, wherein the model adaptation unit is adapted to train a multivariate linear regression model of the relationship between the turbine steam inlet pressure and the electrical energy load using the training data.

21. The power generation system of claim 20, wherein the model adaptation unit is adapted to compute a root-mean-square error for each of the feedforward neural network model and the multivariate linear regression model using process data from the power generation system as testing data.

22. The power generation system of claim 21, wherein the model adaptation unit is adapted to select one of the feedforward neural network model and the multivariate linear regression model, wherein the model with the minimum root-mean-square error is selected for the power generation system to be operatively coupled to the control system, and wherein an input of the selected model includes an electrical energy load set-point to produce a pressure set-point control system output and the pressure set-point control system output of the selected model is coupled to an input of the control system.

23. The power generation system of claim 21, wherein the model adaptation unit is adapted to compute a root-mean-square error for a previous feedforward neural network model of the relationship between the turbine steam inlet pressure and the electrical energy load, a previous multivariate linear regression model of the relationship between the turbine steam inlet pressure and the electrical energy load, and a design model of the relationship between the turbine steam inlet pressure and the electrical energy load using the testing data.

24. The power generation system of claim 23, wherein the model adaptation unit is adapted to select one of the feedforward neural network model, the multivariate linear regression model, the previous feedforward neural network model, the previous multivariate linear regression model and the design model based on the root-mean-square error for each model, wherein the model with the minimum root-mean-square error is selected for the power generation system to be operatively coupled to the control system, and wherein an input of the selected model includes an electrical energy load set-point to produce a pressure set-point control system output and the pressure set-point control system output of the selected model is coupled to an input of the control system.

25. The power generation system of claim 17, further comprising:

a burner system that burns a fuel to generate steam input to the turbine steam inlet system;

wherein the control system includes a controller input generation unit and a controller operatively coupled to the controller input generation unit, wherein the output of the feedforward neural network model is coupled to an input of the controller input signal generation unit, and the controller input signal generation unit is adapted to develop a controller input signal for the controller and the controller is adapted to develop a process control signal to control the burner system to thereby control the pressure in the turbine steam inlet system in response to the controller input signal.

26. The power generation system of claim 25, wherein the controller input signal comprises a controller valve input signal for the controller to control a turbine valve to thereby control an input of steam to the turbine steam inlet system.

27. The power generation system of claim 26, wherein the controller valve input signal comprises a value to maximize the valve opening to the turbine steam inlet system such that the power generation system is in a sliding pressure mode.

28. The power generation system of claim 17, further comprising:

a reheater operatively coupled to the steam turbine power generation unit to reheat steam exiting the steam turbine power generation unit and provide the reheated steam back to the steam turbine power generation unit; and a condenser operatively coupled to the steam outlet of the steam turbine power generation unit to receive steam exhausted from the steam turbine power generation unit;

wherein the feedforward neural network model comprises a multivariable input including the electrical energy load set-point, a reheat temperature deviation, a turbine steam inlet temperature deviation, a condenser back pressure deviation, and an auxiliary steam flow, wherein each of the reheat temperature deviation, the turbine steam inlet temperature deviation, the condenser back pressure deviation, and the auxiliary steam flow have an effect on the electrical energy load.

29. The power generation system of claim 17, wherein the feedforward neural network model comprises a neural network having at least one hidden layer of sigmoid-type neurons.

30. A method of controlling a power generation process in a sliding pressure mode, the power generating process having a steam turbine power generation unit and an electrical energy generation unit, the method comprising:

receiving a set-point indicating a desired output of the electrical energy generation unit;

modeling, via a feedforward neural network model, a relationship between an output of the electrical energy generation unit and throttle pressure to the steam turbine power generation unit in response to the set-point indicating the desired output to develop a predicted pressure set-point control system output; and executing a control routine that determines a control signal for use in controlling the operation of the steam turbine power generation unit based on the predicted pressure set-point control system output.

31. The method of claim 30, wherein the power generation process further has a burner system that burns a fuel to generate steam input to the turbine steam inlet system, and wherein executing a control routine that determines a control signal for use in controlling the operation of the steam turbine power generation unit comprises executing a control routine that determines a control signal for use in controlling the burner system to thereby control the pressure in the turbine steam inlet system.

32. The method of claim 30, wherein executing the control routine further comprises executing a control routine that determines a valve control signal for use in controlling the operation of a turbine valve to thereby control an input of steam to the turbine steam inlet system.

33. The method of claim 32, wherein the valve control signal comprises a value to maximize the valve opening to the turbine steam inlet system such that the power generation process is in the sliding pressure mode.

34. The method of claim 30, wherein modeling, via the feedforward neural network model, the relationship between the output of the electrical energy generation unit and the pressure within a turbine steam inlet system to the steam turbine power generation unit in response to the set-point indicating the desired output further comprises modeling, via the feedforward neural network model, the relationship between the output of the electrical energy generation unit and the pressure within a turbine steam inlet system to the steam turbine power generation unit in response to a reheat temperature deviation, a turbine steam inlet temperature deviation, a condenser back pressure deviation, and an auxiliary steam flow.

35. The method of claim 30, further comprising:

measuring an electrical energy load output of the electrical energy generating unit; and adapting a model of the relationship between the output of the electrical energy generating unit and the pressure within the turbine steam inlet system based on a difference between the set-point indicating the desired output and the measured electrical energy load output.

36. The method of claim 35, wherein adapting the model of the relationship between the output of the electrical energy generating unit and the pressure within the turbine steam inlet system comprises adapting the model of the relationship between the output of the electrical energy generating unit and the pressure within the turbine steam inlet system if the power generation process is operating in a steady-state and the difference between the set-point indicating the desired output and the measured electrical energy load output exceeds a threshold value.

37. The method of claim 35, wherein adapting the model of the relationship between the output of the electrical energy generating unit and the pressure within the turbine steam inlet system comprises training a feedforward neural network model of the relationship between the output of the electrical energy generating unit and the pressure within the turbine steam inlet system.

38. The method of claim 37, wherein training a feedforward neural network model of the relationship between the output of the electrical energy generating unit and the pressure within the turbine steam inlet system comprises training a feedforward neural network model of the relationship between the output of the electrical energy generating unit and the pressure within the turbine steam inlet system using process data from the power generation process as training data.

39. The method of claim 37, wherein adapting the model of the relationship between the output of the electrical energy generating unit and the pressure within the turbine steam inlet system further comprises training a multivariate linear regression model of the relationship between the output of the electrical energy generating unit and the pressure within the turbine steam inlet system.

40. The method of claim 39, wherein training a multivariate linear regression model of the relationship between the output of the electrical energy generating unit and the pressure within the turbine steam inlet system comprises training a multivariate linear regression model of the relationship between the output of the electrical energy generating unit and the pressure within the turbine steam inlet system using process data from the power generation process as training data.

41. The method of claim 39, further comprising determining a root-mean-square error for each of the feedforward neural network model and the multivariate linear regression model.

42. The method of claim 41, wherein determining the root-mean-square error for each of the feedforward neural network model and the multivariate linear regression model comprises determining the root-mean-square error for each of the feedforward neural network model and the multivariate linear regression model using process data from the power generation process as testing data.

43. The method of claim 41, further comprising:

determining a root-mean-square error for each of a previous feedforward neural network model of the relationship between the output of the electrical energy generating unit and the pressure within the turbine steam inlet system, a previous multivariate linear regression model of the relationship between the output of the electrical energy generating unit and the pressure within the turbine steam inlet system, and a design model of the relationship between the output of the electrical energy generating unit and the pressure within the turbine steam inlet system; and selecting one of the feedforward neural network model, the multivariate linear regression model, the previous feedforward neural network model, the previous multivariate linear regression model and the design model with the minimum root-mean-square error for the power generation process.

44. The method of claim 43, wherein determining the root-mean-square error for each of the feedforward neural network model, the multivariate linear regression model, the previous feedforward neural network model, the previous multivariate linear regression model and the design model comprises determining the root-mean-square error for each of the feedforward neural network model, the multivariate linear regression model, the previous feedforward neural network model, the previous multivariate linear regression model and the design model using process data from the power generation process as testing data.

45. The method of claim 30, wherein modeling, via the feedforward neural network model, the relationship between the output of the electrical energy generation unit and pressure within a turbine steam inlet system to the steam turbine power generation unit comprises implementing a feedforward neural network model that models the load output of the electrical energy generation unit in response to the predicted set-point control system output provided to the control routine.

46. A method of adapting a model for a steam turbine power generation process in a sliding pressure mode, the power generating process having a steam turbine power generation unit and an electrical energy generation unit, the method comprising:

receiving a set-point indicating a desired output of the electrical energy generation unit;

executing a control routine that determines a control signal for use in controlling the operation of the steam turbine power generation unit based on a pressure set-point control system output predicted by a first feedforward neural network model of a relationship between an output of the electrical energy generation unit and pressure within a turbine steam inlet system of the steam turbine power generation unit in response to the set-point indicating the desired output to develop the predicted pressure set-point control system output;

measuring an actual output of the electrical energy generation unit in response to the set-point indicating a desired output of the electrical energy generation unit during a steady-state operation of the power generation process; and adapting a second feedforward neural network model of the relationship between the output of the electrical energy generation unit and pressure within the turbine steam inlet system of the steam turbine power generation unit if a difference between the actual output of the electrical energy generation unit and the set-point indicating a desired output of the electrical energy generation unit is greater than a predetermined threshold.

47. The method of claim 46, wherein adapting the second feedforward neural network model comprises training the second feedforward neural network model using process data from the power generation process as training data.

48. The method of claim 47, further comprising training a first multivariate linear regression model of the relationship between the output of the electrical energy generation unit and pressure within the turbine steam inlet system of the steam turbine power generation unit using the training data.

49. The method of claim 48, further comprising computing a root-mean-square error for each of the second feedforward neural network model and the first multivariate linear regression model using process data from the power generation process as testing data.

50. The method of claim 49, further comprising:

selecting one of the second feedforward neural network model and the first multivariate linear regression model with the minimum root-mean-square error; and operatively coupling the selected model to a control system of the power generation process to produce a pressure set-point control system output, wherein an input of the selected model includes the set-point indicating the desired output of the electrical energy generation unit and the pressure set-point control system output is coupled to an input of the control system.

51. The method of claim 49, further comprising:

computing a root-mean-square error for each of the first feedforward neural network model, a second multivariate linear regression model of the relationship between the output of the electrical energy generation unit and pressure within the turbine steam inlet system of the steam turbine power generation unit and a design model of the relationship between the output of the electrical energy generation unit and pressure within the turbine steam inlet system of the steam turbine power generation unit;

selecting one of the first feedforward neural network model, second feedforward neural network model, the first multivariate linear regression model, the second multivariate linear regression model and the design model with the minimum root-mean-square error; and operatively coupling the selected model to a control system of the power generation process to produce a pressure set-point control system output, wherein an input of the selected model includes the set-point indicating the desired output of the electrical energy generation unit and the pressure set-point control system output is coupled to an input of the control system.

* * * * *